(12) United States Patent
Ichikawa

(10) Patent No.: US 11,366,587 B2
(45) Date of Patent: Jun. 21, 2022

(54) ELECTRONIC DEVICE, ELECTRONIC DEVICE CONTROL METHOD, AND RECORDING MEDIUM

(71) Applicant: CASIO COMPUTER CO., LTD., Tokyo (JP)

(72) Inventor: Yuichi Ichikawa, Kodaira (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 17/117,863

(22) Filed: Dec. 10, 2020

(65) Prior Publication Data

US 2021/0173556 A1    Jun. 10, 2021

(30) Foreign Application Priority Data

Dec. 10, 2019  (JP) .............................. JP2019-223213

(51) Int. Cl.
  *G06F 3/041*    (2006.01)
  *G06F 3/0488*   (2013.01)
  *G06F 3/04886*  (2022.01)

(52) U.S. Cl.
  CPC ........ *G06F 3/04886* (2013.01); *G06F 3/0412* (2013.01); *G06F 3/0416* (2013.01)

(58) Field of Classification Search
  CPC .. G06F 3/0412; G06F 3/0416; G06F 3/04886; G06T 11/206
  See application file for complete search history.

(56) References Cited

U.S. PATENT DOCUMENTS

| | | | | |
|---|---|---|---|---|
| 5,836,666 | A | * | 11/1998 | Aoyama ............. G06F 15/0225 |
| 2013/0050064 | A1 | * | 2/2013 | Okano ................. G06F 3/1462 |
| | | | | 345/2.2 |
| 2014/0172132 | A1 | * | 6/2014 | Ura ....................... A61B 5/6813 |
| | | | | 700/90 |
| 2015/0088952 | A1 | * | 3/2015 | Ii ............................ G06F 17/10 |
| | | | | 708/490 |
| 2016/0085716 | A1 | * | 3/2016 | Yoshizawa .......... G06F 15/0225 |
| | | | | 708/146 |
| 2016/0085717 | A1 | * | 3/2016 | Ono ......................... G06F 17/16 |
| | | | | 708/130 |

(Continued)

FOREIGN PATENT DOCUMENTS

| | | |
|---|---|---|
| JP | H07-210517 A | 8/1995 |
| JP | H11-066012 A | 3/1999 |

(Continued)

OTHER PUBLICATIONS

Notice of Reasons for Refusal dated Nov. 9, 2021 received in Japanese Patent Application No. JP 2019-223213 together with an English language translation.

*Primary Examiner* — Ryan A Lubit
(74) *Attorney, Agent, or Firm* — Scully Scott Murphy & Presser

(57) ABSTRACT

Provided is an electronic device including: a communication unit used for communicating with an external device; an input device having a plurality of keys for accepting an input operation of data used for an arithmetic operation; an output device that outputs information; a memory; and at least one processor that causes the output device to provide notice of first information in the case where numerical data for use in the arithmetic operation is received from the external device via the communication unit.

20 Claims, 23 Drawing Sheets

(56) References Cited

U.S. PATENT DOCUMENTS

| | | | | |
|---|---|---|---|---|
| 2016/0086362 | A1* | 3/2016 | Suzuki | G06T 11/206 |
| | | | | 345/440 |
| 2016/0086512 | A1* | 3/2016 | Yoshizawa | G06F 15/0225 |
| | | | | 434/201 |
| 2016/0086513 | A1* | 3/2016 | Uejima | G09B 19/025 |
| | | | | 434/201 |
| 2016/0086578 | A1* | 3/2016 | Iwasaki | G06K 19/06112 |
| | | | | 345/617 |
| 2016/0140430 | A1* | 5/2016 | Kamitani | G06F 15/0225 |
| | | | | 235/494 |
| 2017/0280269 | A1* | 9/2017 | Iwasaki | H04W 4/50 |
| 2017/0280272 | A1* | 9/2017 | Tanaka | H04M 1/0266 |
| 2018/0150852 | A1* | 5/2018 | Poma | G06Q 30/0201 |
| 2018/0181535 | A1* | 6/2018 | Yoshizawa | G06F 15/0225 |

FOREIGN PATENT DOCUMENTS

| | | | |
|---|---|---|---|
| JP | 2013-050746 A | | 3/2013 |
| JP | 2013-073539 A | | 4/2013 |
| JP | 2016-163309 A | | 9/2016 |
| JP | 2017-174190 A | | 9/2017 |
| JP | 2017174190 A | * | 9/2017 |
| JP | 2018-045520 A | | 3/2018 |
| JP | 2018-147185 A | | 9/2018 |

* cited by examiner

FIG. 5

| STORAGE PROCEDURE | DATA INPUT | | NUMBER INPUT AREA | FIRST NUMBER STORAGE AREA | SECOND NUMBER STORAGE AREA | M INDEPENDENT MEMORY STORAGE AREA | KEY TRANSFER MEMORY STORAGE AREA | OPERATOR INFORMATION AREA | DISPLAY SCREEN | | | | |
|---|---|---|---|---|---|---|---|---|---|---|---|---|---|
| | CALCULATOR KEY | EXTERNAL DEVICE | | | | | | | SYMBOL | | | | MAIN SCREEN NUMBER INPUT AREA |
| | | | | | | | | | OPERATOR | = | M1 | M2 | GT | |
| (A) | 1 | | 1 | 0 | 0 | 0 | 0 | | | | | | | 1 |
| (B) | 2 | | 12 | 0 | 0 | 0 | 0 | | | | | | | 12 |
| (C) | 3 | | 123 | 0 | 0 | 0 | 0 | | | | | | | 123 |
| (D) | 4 | | 1234 | 0 | 0 | 0 | 0 | | | | | | | 1234 |
| (E) | M+ | | 1234 | 0 | 0 | 1234 | 0 | M1+ | | | M1 | | | 1234 |
| (F) | 5 | | 5 | 0 | 0 | 1234 | 0 | M1+ | | | M1 | | | 5 |
| (G) | 6 | | 56 | 0 | 0 | 1234 | 0 | M1+ | | | M1 | | | 56 |
| (H) | + | | 56 | 56 | 0 | 1234 | 0 | + | + | | M1 | | | 56 |
| (I) | C | | 0 | 56 | 0 | 1234 | 0 | + | + | | M1 | | | 0 |
| (J) | M1R | | 1234 | 56 | 1234 | 1234 | 0 | + | + | | M1 | | | 1234 |
| (K) | = | | 1290 | 1290 | 1234 | 1234 | 0 | = | = | | M1 | | GT | 1290 |

FIG. 8

| Storage Procedure | Data Input | | Number Input Area | First Number Storage Area | Second Number Storage Area | M Independent Memory Storage Area | Key Transfer Memory Storage Area | Operator Information Area | Display Screen | | | | | |
|---|---|---|---|---|---|---|---|---|---|---|---|---|---|---|
| | Calculator Key | External Device | | | | | | | Symbol | | | | | Main Screen Number Input Area |
| | | | | | | | | | Operator | = | M1 | M2 | GT | |
| (A) | | 1234 | 0 | 0 | 0 | 0 | 0(CLEAR) | | | | | | | 0 |
| (B) | | | 1234 | 0 | 0 | 0 | 1234 | | | | | | | 1 |
| (C) | M2+ | | 1234 | 0 | 0 | 0 | 1234 | M2+ | | | | | | 1 |
| (D) | M2+ | | 1234 | 1234 | 0 | 0 | 1234 | M2+ | | | | M2 | | 1234 |
| (E) | + | | 1234 | 1234 | 0 | 0 | 1234 | + | + | | | M2 | | 1234 |
| (F) | 5 | | 5 | 1234 | 5 | 0 | 1234 | + | + | | | M2 | | 5 |
| (G) | 6 | | 56 | 1234 | 56 | 0 | 1234 | + | + | | | M2 | | 56 |
| (H) | = | | 1290 | 1290 | 56 | 0 | 1234 | = | | = | | M2 | GT | 1290 |

FIG. 10

| STORAGE PROCEDURE | DATA INPUT | | NUMBER INPUT AREA | FIRST NUMBER STORAGE AREA | SECOND NUMBER STORAGE AREA | M INDEPENDENT MEMORY STORAGE AREA | KEY TRANSFER MEMORY STORAGE AREA | OPERATOR INFORMATION AREA | DISPLAY SCREEN | | | | | |
|---|---|---|---|---|---|---|---|---|---|---|---|---|---|---|
| | CALCULATOR KEY | EXTERNAL DEVICE | | | | | | | SYMBOL | | | | | MAIN SCREEN NUMBER INPUT AREA |
| | | | | | | | | | OPERATOR | = | M1 | M2 | GT | |
| (A) | 5 | | 5 | 0 | 0 | 0 | 0 | | | | | | | 5 |
| (B) | 6 | | 56 | 0 | 0 | 0 | 0 | | | | | | | 56 |
| (C) | + | | 56 | 56 | 0 | 0 | 0 | + | + | | | | | 56 |
| (D) | | 1234 | 56 | 56 | 0 | 0 | 0(CLEAR) | + | + | | | | | → |
| (E) | | | 1234 | 56 | 0 | 0 | 0 | + | + | | | | | → |
| (F) | | | 1234 | 56 | 0 | 0 | 1234 | + | + | | | | | → |
| (G) | | | 1234 | 56 | 1234 | 0 | 1234 | M2+ | | | | M2 | | 1234 |
| (H) | = | | 1290 | 1290 | 1234 | 0 | 1234 | = | = | | | M2 | GT | 1290 |

FIG. 11

| STORAGE PROCEDURE | DATA INPUT | | NUMBER INPUT AREA | FIRST NUMBER STORAGE AREA | SECOND NUMBER STORAGE AREA | M INDEPENDENT MEMORY STORAGE AREA | KEY TRANSFER MEMORY STORAGE AREA | OPERATOR INFORMATION AREA | DISPLAY SCREEN | | | | | |
|---|---|---|---|---|---|---|---|---|---|---|---|---|---|---|
| | CALCULATOR KEY | EXTERNAL DEVICE | | | | | | | OPERATOR | SYMBOL | | | | MAIN SCREEN NUMBER INPUT AREA |
| | | | | | | | | | | = | M1 | M2 | GT | |
| (A) | | 1234 | 0 | 0(CLEAR) | 0 | 0 | | | | | | | | 0 |
| (B) | | | 1234 | 0 | 0 | 0 | | | | | | | | 1234 |
| (C) | | | 1234 | 1234 | 0 | 0 | | M2+ | | | | M2 | | 1234 |
| (D) | + | | 1234 | 1234 | 0 | 0 | | + | + | | | M2 | | 1234 |
| (E) | 5 | | 5 | 1234 | 5 | 0 | | + | + | | | M2 | | 5 |
| (F) | 6 | | 56 | 1234 | 56 | 0 | | + | + | | | M2 | | 56 |
| (G) | = | | 1290 | 1290 | 56 | 0 | | = | = | | | M2 | GT | 1290 |

FIG. 12

| STORAGE PROCEDURE | DATA INPUT | | NUMBER INPUT AREA | FIRST NUMBER STORAGE AREA | SECOND NUMBER STORAGE AREA | M INDEPENDENT MEMORY STORAGE AREA | KEY TRANSFER MEMORY STORAGE AREA | OPERATOR INFORMATION AREA | DISPLAY SCREEN | | | | |
|---|---|---|---|---|---|---|---|---|---|---|---|---|---|
| | CALCULATOR KEY | EXTERNAL DEVICE | | | | | | | SYMBOL | | | | MAIN SCREEN NUMBER INPUT AREA |
| | | | | | | | | | OPERATOR | = | M1 | M2 | GT | |
| (A) | 5 | | 5 | 0 | 0 | 0 | | | | | | | | 5 |
| (B) | 6 | | 56 | 0 | 0 | 0 | | | | | | | | 56 |
| (C) | + | | 56 | 56 | 0 | 0 | | + | + | | | | | 56 |
| (D) | | 1234 | 56 | 56 | 0(CLEAR) | 0 | | + | + | | | | | → |
| (E) | | | 1234 | 56 | 0 | 0 | | + | + | | | | | → |
| (F) | | | 1234 | 56 | 1234 | 0 | | M2+ | + | | | M2 | | 1234 |
| (G) | = | | 1290 | 1290 | 1234 | 0 | | = | | = | | M2 | GT | 1290 |

FIG. 13

| STORAGE PROCEDURE | DATA INPUT | | NUMBER INPUT AREA | FIRST NUMBER STORAGE AREA | SECOND NUMBER STORAGE AREA | M INDEPENDENT MEMORY STORAGE AREA | KEY TRANSFER MEMORY STORAGE AREA | OPERATOR INFORMATION AREA | DISPLAY SCREEN | | | | | |
|---|---|---|---|---|---|---|---|---|---|---|---|---|---|---|
| | CALCULATOR KEY | EXTERNAL DEVICE | | | | | | | SYMBOL | | | | | MAIN SCREEN NUMBER INPUT AREA |
| | | | | | | | | | OPERATOR | = | M1 | M2 | GT | |
| (A) | | 1234 | 0 | 0 | 0 | 0 | 0(CLEAR) | | | | | | | 0 |
| (B) | | | 1234 | 0 | 0 | 0 | 0 | | | | | | | → |
| (C) | | | 1234 | 0 | 0 | 0 | Err | | | | | | | → |
| (D) | | | 1234 | 0 | 0 | 0 | Err | | | | | | | Err |

FIG. 14

| Storage Procedure | Data Input | | Number Input Area | First Number Storage Area | Second Number Storage Area | M Independent Memory Storage Area | Key Transfer Memory Storage Area | Operator Information Area | Display Screen | | | | | |
|---|---|---|---|---|---|---|---|---|---|---|---|---|---|---|
| | Calculator Key | External Device | | | | | | | Symbol | | | | | Main Screen Number Input Area |
| | | | | | | | | | Operator | = | M1 | M2 | GT | |
| (A) | 5 | | 5 | 0 | 0 | 0 | 0 | | | | | | | 5 |
| (B) | 6 | | 56 | 0 | 0 | 0 | 0 | | | | | | | 56 |
| (C) | + | | 56 | 56 | 0 | 0 | 0 | + | + | | | | | 56 |
| (D) | | 1234 | 56 | 56 | 0 | 0 | 0 | + | + | | | | | → |
| (E) | | | 56 | 56 | 0 | 0 | 0(CLEAR) | + | + | | | | | → |
| (F) | | | 1234 | 56 | 0 | 0 | 0 | + | + | | | | | → |
| (G) | | | 1234 | 56 | 0 | 0 | Err | | | | | | | → |
| (H) | | | 1234 | 56 | 0 | 0 | Err | | | | | | | Err |

FIG. 15

| STORAGE PROCEDURE | DATA INPUT | | NUMBER INPUT AREA | FIRST NUMBER STORAGE AREA | SECOND NUMBER STORAGE AREA | M INDEPENDENT MEMORY STORAGE AREA | KEY TRANSFER MEMORY STORAGE AREA | OPERATOR INFORMATION AREA | DISPLAY SCREEN | | | | |
|---|---|---|---|---|---|---|---|---|---|---|---|---|---|
| | CALCULATOR KEY | EXTERNAL DEVICE | | | | | | | OPERATOR | SYMBOL | | | MAIN SCREEN NUMBER INPUT AREA |
| | | | | | | | | | | = | M | GT | |
| (A) | 5 | | 5 | 0 | 0 | 0 | | Clear | | | | | 5. |
| (B) | 6 | | 56 | 0 | 0 | 0 | | Clear | | | | | 56. |
| (C) | + | | 56 | 56 | 0 | 0 | | + | + | | | | 56. |
| (D) | | 1234 | 56 | 56 | 0 | 0 | | + | + | | | | 56. |
| (E) | | | 1234 | 56 | 0 | 0 | | + | + | | | | 1234. |
| (F) | = | | 1234 | 1234 | 0 | 0 | | = | | = | | | 1234. |

FIG. 16

| STORAGE PROCEDURE | DATA INPUT | | NUMBER INPUT AREA | FIRST NUMBER STORAGE AREA | SECOND NUMBER STORAGE AREA | M INDEPENDENT MEMORY STORAGE AREA | OPERATOR INFORMATION AREA | DISPLAY SCREEN | | | | MAIN SCREEN NUMBER INPUT AREA |
|---|---|---|---|---|---|---|---|---|---|---|---|---|
| | CALCULATOR KEY | EXTERNAL DEVICE | | | | | | SYMBOL | | | | |
| | | | | | | | | OPERATOR | = | M | GT | |
| (A) | | 1234 | 0 | 0 | 0 | 0 | Clear | | | | | 0. |
| (B) | | | 1234 | 0 | 0 | 0 | Clear | | | | | 1234. |
| (C) | + | | 1234 | 0 | 0 | 0 | + | + | | | | 1234. |
| (D) | 5 | | 5 | 0 | 5 | 0 | + | + | | | | 5. |
| (E) | 6 | | 56 | 0 | 56 | 0 | + | + | | | | 56. |
| (F) | = | | 56 | 56 | 56 | 0 | = | | | GT | 56. |

FIG. 18

| STORAGE PROCEDURE | DATA INPUT | | NUMBER INPUT AREA | FIRST NUMBER STORAGE AREA | SECOND NUMBER STORAGE AREA | M INDEPENDENT MEMORY STORAGE AREA | KEY TRANSFER MEMORY STORAGE AREA | OPERATOR INFORMATION AREA | DISPLAY SCREEN | | | | |
|---|---|---|---|---|---|---|---|---|---|---|---|---|---|
| | CALCULATOR KEY | EXTERNAL DEVICE | | | | | | | SYMBOL | | | MAIN SCREEN NUMBER INPUT AREA | SUB-SCREEN KEY TRANSFER MEMORY STORAGE AREA |
| | | | | | | | | | OPERATOR | = M | GT | | |
| (A) | | 1234 | 0 | 0 | 0 | 0 | 0(CLEAR) | | | | | 0 | 0 |
| (B) | | | 1234 | 0 | 0 | 0 | 0 | | | | | ↓ | ↓ |
| (C) | | | 1234 | 0 | 0 | 0 | 1234 | | | | | ↓ | ↓ |
| (D) | | | 1234 | 1234 | 0 | 0 | 1234 | | | | | 1234 | 1234 |
| (E) | + | | 1234 | 1234 | 0 | 0 | 1234 | + | + | | | 1234 | 1234 |
| (F) | 5 | | 5 | 1234 | 5 | 0 | 1234 | + | + | | | 5 | 1234 |
| (G) | 6 | | 56 | 1234 | 56 | 0 | 1234 | + | + | | | 56 | 1234 |
| (H) | = | | 1290 | 1290 | 56 | 0 | 1234 | = | | = | GT | 1290 | 1234 |

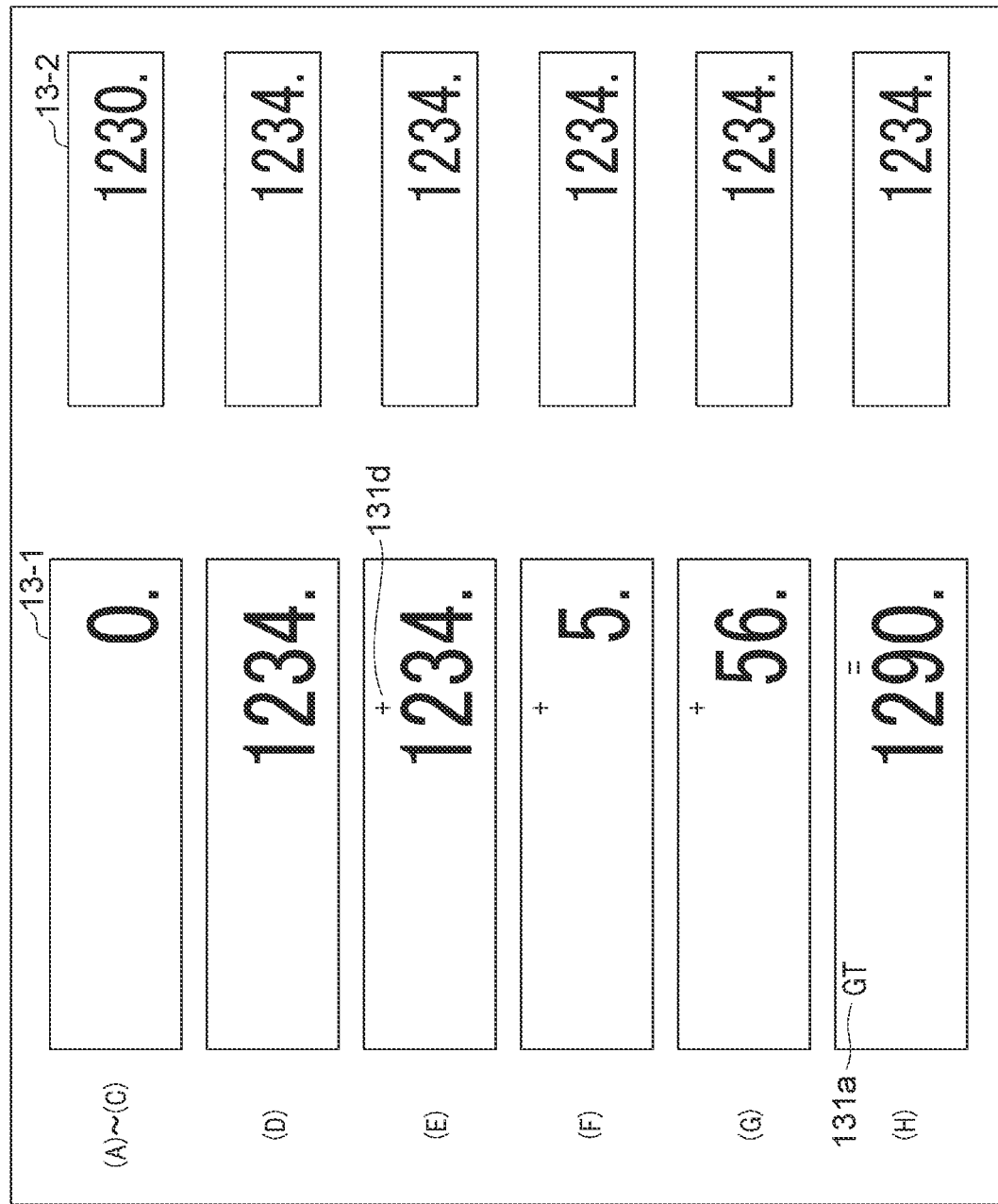

FIG. 20

| Storage Procedure | Data Input | | Number Input Area | First Number Storage Area | Second Number Storage Area | M Independent Memory Storage Area | Key Transfer Memory Storage Area | Operator Information Area | Display Screen | | | | | |
|---|---|---|---|---|---|---|---|---|---|---|---|---|---|---|
| | Calculator Key | External Device | | | | | | | Symbol | | | | Main Screen Number Input Area | Sub-screen Key Transfer Memory Storage Area |
| | | | | | | | | | Operator | = | M | GT | | |
| (A) | 5 | | 5 | 0 | 0 | 0 | 0 | | | | | | 5 | 0 |
| (B) | 6 | | 56 | 0 | 0 | 0 | 0 | | | | | | 56 | 0 |
| (C) | + | | 56 | 56 | 0 | 0 | 0 | + | + | | | | 56 | 0 |
| (D) | | 1234 | 56 | 56 | 0 | 0 | 0(CLEAR) | + | + | | | | → | → |
| (E) | | | 1234 | 56 | 0 | 0 | 0 | + | + | | | | → | → |
| (F) | | | 1234 | 56 | 1234 | 0 | 1234 | + | + | | | | → | → |
| (G) | | | 1234 | 1290 | 1234 | 0 | 1234 | | | | | | 1234 | 1234 |
| (H) | = | | 1290 | 1290 | 1234 | 0 | 1234 | = | = | | | GT | 1290 | 1234 |

FIG. 21

| STORAGE PROCEDURE | DATA INPUT | | NUMBER INPUT AREA | FIRST NUMBER STORAGE AREA | SECOND NUMBER STORAGE AREA | M INDEPENDENT MEMORY STORAGE AREA | KEY TRANSFER MEMORY STORAGE AREA | OPERATOR INFORMATION AREA | DISPLAY SCREEN | | | | |
|---|---|---|---|---|---|---|---|---|---|---|---|---|---|
| | CALCULATOR KEY | EXTERNAL DEVICE | | | | | | | SYMBOL | | | MAIN SCREEN NUMBER INPUT AREA | SUB-SCREEN KEY TRANSFER MEMORY STORAGE AREA |
| | | | | | | | | | OPERATOR | = | M | GT | | |
| (A) | | 1234 | 0 | 0 | 0 | 0 | 0(CLEAR) | | | | | 0 | 0(CLEAR) |
| (B) | 1234 | | 1234 | 0 | 0 | 0 | 0 | | | | | → | → |
| (C) | 1234 | | 1234 | 0 | 0 | 0 | 1234 | | | | | → | → |
| (D) | 1234 | | 1234 | 1234 | 0 | 0 | 1234 | | | | | 1234 | 1234 |
| (E) | 5 | | 5 | 1234 | 0 | 0 | 1234 | | | | | 5 | 1234 |
| (F) | 6 | | 56 | 1234 | 0 | 0 | 1234 | | | | | 56 | 1234 |
| (G) | = | | 56 | 56 | 0 | 0 | 1234 | = | = | | GT | 56 | 1234 |

FIG. 22

| STORAGE PROCEDURE | DATA INPUT | | NUMBER INPUT AREA | FIRST NUMBER STORAGE AREA | SECOND NUMBER STORAGE AREA | M INDEPENDENT MEMORY STORAGE AREA | KEY TRANSFER MEMORY STORAGE AREA | OPERATOR INFORMATION AREA | DISPLAY SCREEN | | | | |
|---|---|---|---|---|---|---|---|---|---|---|---|---|---|
| | CALCULATOR KEY | EXTERNAL DEVICE | | | | | | | SYMBOL | | | MAIN SCREEN NUMBER INPUT AREA | SUB-SCREEN KEY TRANSFER MEMORY STORAGE AREA |
| | | | | | | | | | OPERATOR | = | M | GT | | |
| (A) | 5 | | 5 | 0 | 0 | 0 | 0 | | | | | | 5 | 0 |
| (B) | 6 | | 56 | 0 | 0 | 0 | 0 | | | | | | 56 | 0 |
| (C) | | 1234 | 56 | 0 | 0 | 0 | 0 (CLEAR) | | | | | | → | → |
| (D) | | | 1234 | 0 | 0 | 0 | 0 | | | | | | → | → |
| (E) | | | 1234 | 0 | 0 | 0 | 1234 | | | | | | → | → |
| (F) | | | 1234 | 1234 | 0 | 0 | 1234 | | | | | | 1234 | 1234 |
| (G) | = | | 1234 | 1234 | 0 | 0 | 1234 | = | | = | | GT | 1234 | 1234 |

ELECTRONIC DEVICE, ELECTRONIC DEVICE CONTROL METHOD, AND RECORDING MEDIUM

BACKGROUND

1. Field

The present invention relates to an electronic device, an electronic device control method, and a recording medium.

2. Related Art

For example, a hardware key is arranged in an electronic desk calculator (hereinafter, referred to as a calculator) disclosed in Japanese Patent Application Laid-Open No. Hei 11-66012. This hardware key has user-friendly specifications for input, such that key press mistakes are prevented, a feeling of pressing can be easily obtained, and input by blind touch can be easily performed.

On the other hand, in recent years, smart devices such as smartphones (external devices) have become widespread, and calculator software is also provided as application software for these smart devices. The smart devices, however, generally do not have hardware keys, which makes it difficult to perform input operations problematically. Therefore, it is conceivable to use an electronic device such as a calculator as an input device for a smart device by making an electronic device, such as a calculator equipped with hardware keys, work in cooperation with a smart device. On the contrary, if the processing result of the smart device can be fed back to the electronic device and the electronic device can take over the behavior using the processing result of the smart device, not only the electronic device can be used simply as an input device, but also the utility value of the electronic device also improves.

Specifically, it is conceivable that the devices will work together such that a complex arithmetic operation that is difficult to perform with only an electronic device such as a calculator or that makes operations complicated is performed in an application running on a smart device and then numerical data as the execution result is transferred to an electronic device such as a calculator, and the arithmetic operation using the transferred numerical data is subsequently performed by the electronic device such as a calculator. Conventional electronic devices such as calculators, however, do not assume performing an arithmetic operation using data received from the outside. Therefore, the cooperative behavior of the devices has a problem that it is difficult for an electronic device user to know whether the electronic device received data from the outside.

SUMMARY

According to an aspect of the present invention, there is provided an electronic device including: a communication unit used for communicating with an external device; an input device having a plurality of keys for accepting an input operation of data used for an arithmetic operation; an output device that outputs information; a memory; and at least one processor that causes the output device to provide notice of first information in the case where numerical data for use in the arithmetic operation is received from the external device via the communication unit.

BRIEF DESCRIPTION OF THE DRAWINGS

FIG. 5 is a diagram for describing the storage procedure for respective areas of a memory of the calculator according to input data received from a key input unit of the calculator.

FIG. 8 is a diagram illustrating storage procedures for respective areas and the contents of a display screen.

FIG. 10 is a diagram illustrating the storage procedures for respective areas and the contents of a display screen.

FIG. 11 is a diagram illustrating the storage procedures for respective areas and the contents of a display screen.

FIG. 12 is a diagram illustrating the storage procedures for respective areas and the contents of a display screen.

FIG. 13 is a diagram illustrating the storage procedures for respective areas and the contents of a display screen.

FIG. 14 is a diagram illustrating the storage procedures for respective areas and the contents of a display screen.

FIG. 15 is a diagram illustrating the storage procedures for respective areas and the contents of a display screen in a comparative example.

FIG. 16 is a diagram illustrating the storage procedures for respective areas and the contents of a display screen in a comparison example.

FIG. 18 is a diagram illustrating the storage procedures for respective areas and the contents of a display screen.

FIG. 19 is a diagram illustrating sample displays corresponding to the storage procedures illustrated in FIG. 18.

FIG. 20 is a diagram illustrating the storage procedures for respective areas and the contents of a display screen.

FIG. 21 is a diagram illustrating the storage procedures for respective areas and the contents of a display screen.

FIG. 22 is a diagram illustrating the storage procedures for respective areas and the contents of a display screen.

DETAILED DESCRIPTION

Hereinafter, embodiments of the present invention will be described with reference to appended drawings. In some drawings, some members are omitted for clarity.

First Embodiment

A first embodiment will be described below. An electronic device of the first embodiment receives numerical data used for an arithmetic operation from an external device and then stores the numerical data into a memory area (operand storage area) for storing numerical values for an arithmetic operation, and thereafter provides notice thereof accordingly by a predetermined output from an output device.

Figure 1:
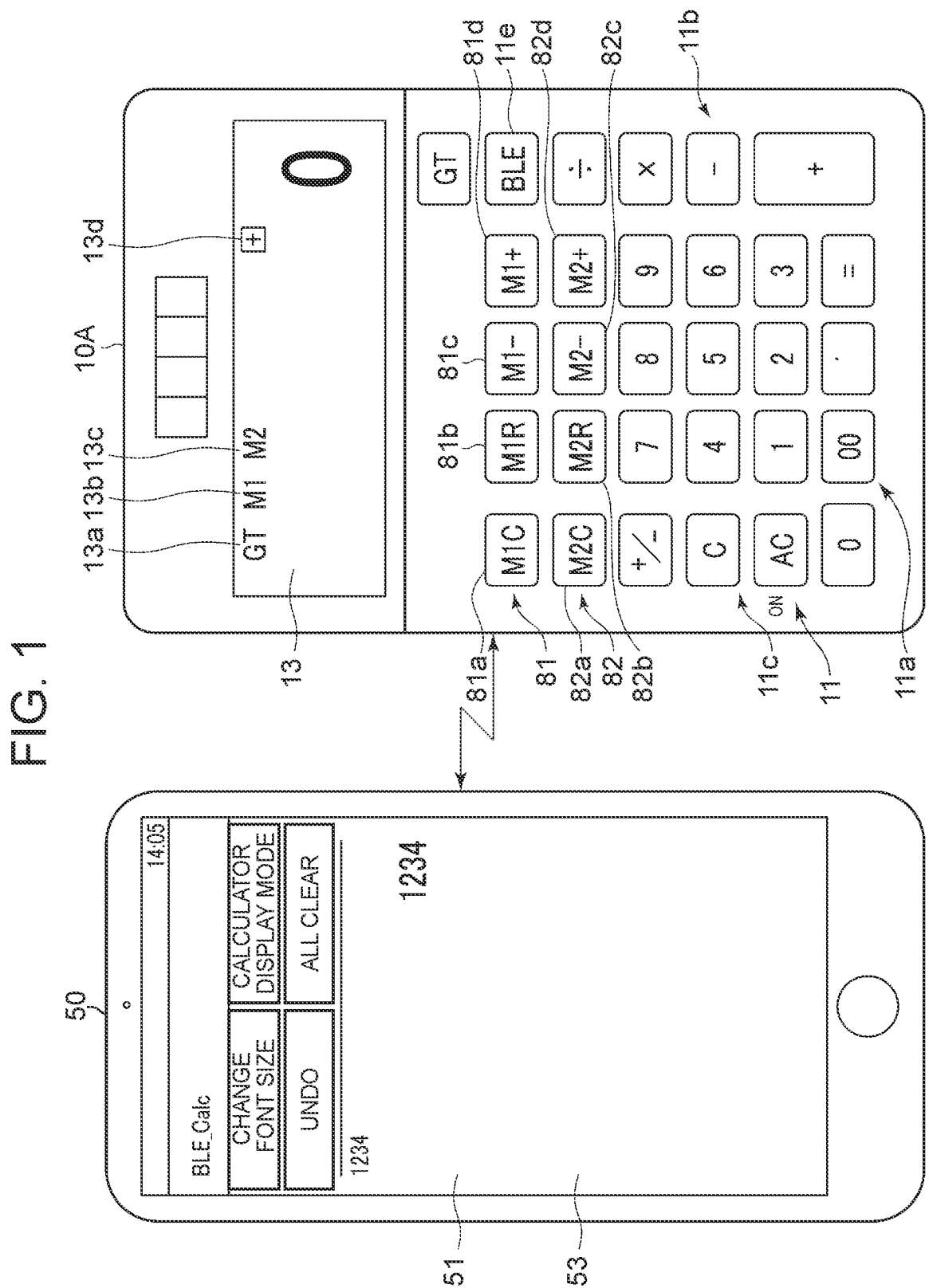
FIG. 1 is a front view illustrating the appearance configurations of a calculator as an electronic device according to a first embodiment and a smartphone that performs data communication with the calculator.

FIG. 1 is a front view illustrating the appearance configurations of an electronic desk calculator (hereinafter, referred to as a calculator 10A) as an electronic device and a smartphone 50 that performs data communication with the calculator 10A.

The calculator 10A communicates data with the smartphone 50 using a near field communication technology such as, for example, Bluetooth® Low Energy (hereinafter, referred to as BLE), or the like. The calculator 10A is an example of an electronic device capable of data communication. Instead of the calculator 10A, however, another device with hardware keys and a calculation function may be used. The smartphone 50 is an example of a smart device capable of data communication and, for example, a tablet terminal may be used instead of the smartphone 50.

A key input unit 11 and a display unit 13 are provided on the front of the main body of the calculator 10A.

The key input unit 11 has a hardware key group including, for example, a numeric key 11a, a calculation key 11b, a first function key 11c, and a second function key 11d.

The numeric key 11a has a plurality of keys respectively corresponding to [00] and [0] to [9], for example. The calculation key 11b includes a plurality of keys respectively corresponding to [+] (addition), [−] (subtraction), [×] (multiplication), [+] (division), and [=] (equal), for example.

The first function key 11c includes, for example, an all-clear key ([AC] key), a clear key ([C] key), and a plurality of memory keys 81 and 82 ([MC](memory clear), [MR](memory recall), [M+](memory plus), and [M−] (memory minus)) related to memory functions, and [GT] key 83 (grand total key). The memory keys 81 and 82 are used to perform memory functions by using different memory storage areas. For example, the memory key 81 uses an M independent memory storage area 29 described later, and the memory key 82 uses a key transfer memory storage area 31 described later, which is different from the M independent memory storage area 29, to perform memory functions. The memory key 81 is provided with, for example, an [M1C] key 81a (memory clear), an [M1R] key 81b (memory recall), an [M1−] key 81c (memory minus), and an [M1+] key 81d (memory plus). In addition, the memory key 82 is provided with, for example, an [M2C] key 82a, an [M2R] key 82b, an [M2−] key 82c, and an [M2+] key 82d, as in the case of the memory key 81.

The second function key 11d has a BLE key 11e that is operated so that the calculator 10 synchronizes with the smartphone 50 when the calculator 10 communicates data with the smartphone 50 by using BLE. The second function key 11d may further include a plurality of direction keys (up key, down key, left key, and right key) respectively corresponding to the up, down, left, and right directions, a backspace ([BS]) key, and an enter key ([Enter]). These keys each have a pressing (stroke) key structure in which the content written (printed) on the key top is input to an arithmetic processing system in the calculator 10 when the corresponding key is pressed by a user's pressing operation.

The display unit 13 is composed of a dot matrix type or a segment type (for example, so-called hinoji-shaped) liquid crystal display unit. The display unit 13 displays a numerical value and an operator that have been input by pressing a numeric key 11a and a calculation key 11b, a symbol (grand total symbol [GT] 13a) corresponding to the [GT] key 83 (grand total key), a symbol (memory 1 symbol [M1] 13b) corresponding to the memory key 81, a symbol (memory 2 symbol [M2] 13c) corresponding to the memory key 82, an operator symbol 13d corresponding to the input operator, a symbol (BLE) indicating that the calculator 10 is connected to the smartphone 50 via BLE, and the like. The operator symbol 13d includes symbols respectively corresponding to [+] (addition), [−] (subtraction), [×] (multiplication), [+] (division), [=] (equal) that correspond to the plurality of calculation keys 11b.

The memory 1 symbol [M1] 13b is displayed in the case where a numerical value is stored in the M independent memory storage area 29, in response to a pressing operation of the [M1−] key 81c or the [M1+] key 81d. The memory 2 symbol [M2] 13c is displayed after storing a received numerical value in a number storage area (a first number storage area 331 or a second number storage area 332) described later, in the case where the numerical value is stored in the key transfer memory storage area 31 and in the case where the numerical value is received from the smartphone 50 (external device), in response to the pressing operation of the [M2−] key 82c or the [M2+] key 82d.

The calculator 10A of the first embodiment displays the memory 1 symbol [M1] 13b and the memory 2 symbol [M2] 13c, thereby enabling distinguishing between a numerical value stored in the M independent memory storage area 29 and a numerical value stored in the key transfer memory storage area 31, visualization of a numerical value received from an external device and stored in the key transfer memory storage area 31, and an arithmetic operation using numerical values stored in the M independent memory storage area 29 and in the key transfer memory storage area 31. Further, the calculator 10A of the first embodiment stores the numerical value received from the external device into the number storage area (the first number storage area 331 or the second number storage area 332) where numerical values for arithmetic operations are stored and then displays, for example, the memory 2 symbol [M2] 13c to provide notice of the fact.

The main body of the smartphone 50 is provided on the front with a touch panel 51 for use in inputting information such as numerical values and characters to the smartphone 50 and with a display unit 53 for use in displaying information that has been input from the touch panel 51. The touch panel 51 is placed on the display unit 53.

Figure 2:
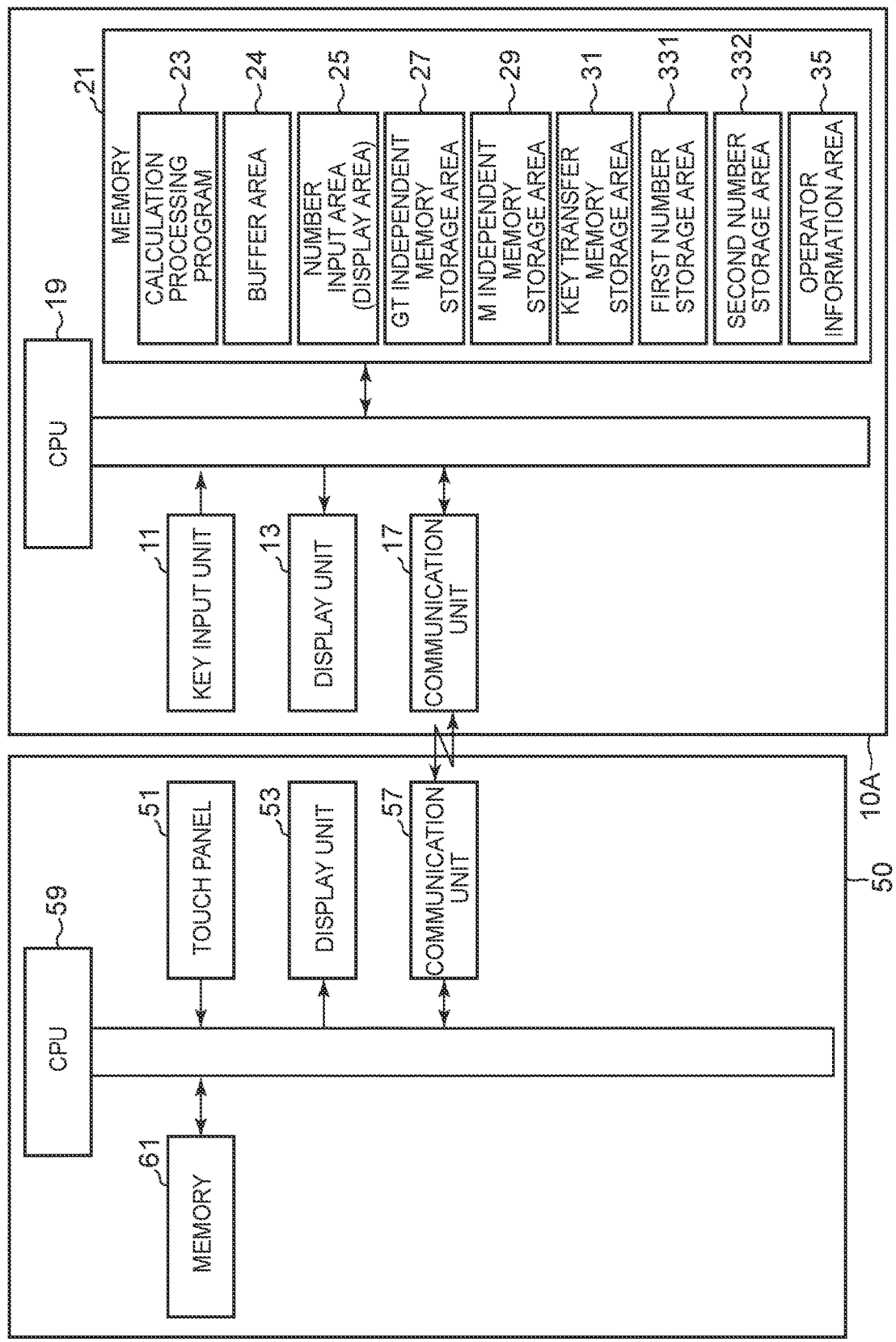
FIG. 2 is a block diagram illustrating the configurations of the respective electronic circuits of the calculator and the smartphone illustrated in FIG. 1.

FIG. 2 is a block diagram illustrating the configuration of the respective electronic circuits of the calculator 10 and the smartphone 50 illustrated in FIG. 1.

The electronic circuits of the calculator 10A and the smartphone 50 each have a plurality of units, which include a communication unit 17 or 57, a central processing unit (CPU) 19 or 59, which is a processor forming a computer, and a memory 21 or 61. The units of the calculator 10 further include the key input unit 11 and the display unit 13 described above, and the units of the smartphone 50 further include the touch panel 51 and the display unit 53 described above.

The communication unit 17 of the calculator 10A is a communication interface that wirelessly communicates data with the communication unit 57 of the smartphone 50 using BLE in response to the pressing of the BLE key 11e. The communication units 17 and 57 may communicate data with each other via a server on a communication network (including the Internet and the like). Further, in the case where the communication unit 17 has only a wired serial communication function, a BLE unit may be connected to the communication unit 17 so that wireless data communication can be performed via the BLE unit.

The CPU 19 of the calculator 10A controls the behaviors of the respective parts of the circuit by executing a calculation processing program 23 stored in the memory 21 of the calculator 10A to perform various arithmetic processes according to inputs from the key input unit 11. The calculation processing program 23 has, for example, variables or the like set for displaying operators as so-called symbols on the display unit 13, and the CPU 19 enables the symbols or the like corresponding to the types of the operators input from the key input unit 11 to be displayed on the display unit 13.

Although the calculation processing program 23 is stored in the memory 21 in advance, it may be downloaded from the smartphone 50 or from the server on the communication network via the communication unit 17 and then stored in the memory 21. Further, the calculation processing program 23 may be read from an external recording medium such as a memory card via a recording medium reading unit (not illustrated) and then stored in the memory 21.

In the memory 21, there are secured a buffer area 24, a number input area 25, a GT independent memory storage area 27, an M independent memory storage area 29, a key transfer memory storage area 31, a first number storage area 331, a second number storage area 332, and an operator information area 35.

The buffer area 24 is used as a key input buffer that temporarily holds input data input from the key input unit 11 and as a receive buffer that temporarily holds data received through the communication unit 17. In the buffer area 24, a numerical value (numerical data), which is received from the smartphone 50 by data communication with the smartphone 50 by using the communication unit 17, for use in an arithmetic operation is temporarily stored. The numerical value temporarily stored in the buffer area 24 is stored in the number input area 25 in the same manner as the numerical value input by operating the numeric key 11a.

The number input area 25 is an area where a value (numerical value) to be displayed on the display unit 13 is stored. When the numeric key 11a is pressed, a key code (numeric code) indicating the numerical value written on the key top of the numeric key 11a is stored in the number input area 25, as one element.

In the GT independent memory storage area 27, a numerical value displayed on the display unit 13 by operating the [GT] key 83 is stored.

The M independent memory storage area 29 is an area used to perform the memory function in response to the operation of pressing the memory key 81. When the memory key 81 ([M1−] key 81c, the [M1+] key 81d) is pressed, the M independent memory storage area 29 stores a numerical value obtained by an arithmetic operation (addition or subtraction) between a numerical value already stored in the M independent memory storage area 29 and a numerical value stored in the number input area 25 by overwriting.

The key transfer memory storage area 31 stores the numerical value received from the smartphone 50 copied from the number input area 25. The numerical value, which has been received from the smartphone 50 and stored in the key transfer memory storage area 31, is stored in the first number storage area 331 or in the second number storage area 332. The key transfer memory storage area 31 is used to perform the memory function in response to the operation of pressing the memory key 82.

The first number storage area 331 is an operand storage area that stores the fixed number (numerical value) used for an arithmetic operation and stores the numerical value that was input before the input of the operator. The second number storage area 332 is an operand storage area that stores the fixed number (numerical value) used for an arithmetic operation and stores the numerical value that was input after the input of the operator. In the case where the numerical value used for an arithmetic operation is received from the smartphone 50, the numerical value stored in the key transfer memory storage area 31 is stored in the first number storage area 331 or in the second number storage area 332. If the numerical value is received from the smartphone 50 before the operator is input, the numerical value stored in the key transfer memory storage area 31 is copied and stored in the first number storage area 331. On the other hand, if the numerical value is received from the smartphone 50 after the operator is input, the numerical value stored in the key transfer memory storage area 31 is copied and stored in the second number storage area 332.

The operator information area 35 stores an operator used for an arithmetic operation.

The CPU 59 of the smartphone 50 controls the behaviors of the parts of the circuit by executing the calculation processing program stored in the memory 61 of the smartphone 50 and performs variable arithmetic processes in response to an input from the touch panel 51.

Figure 3:
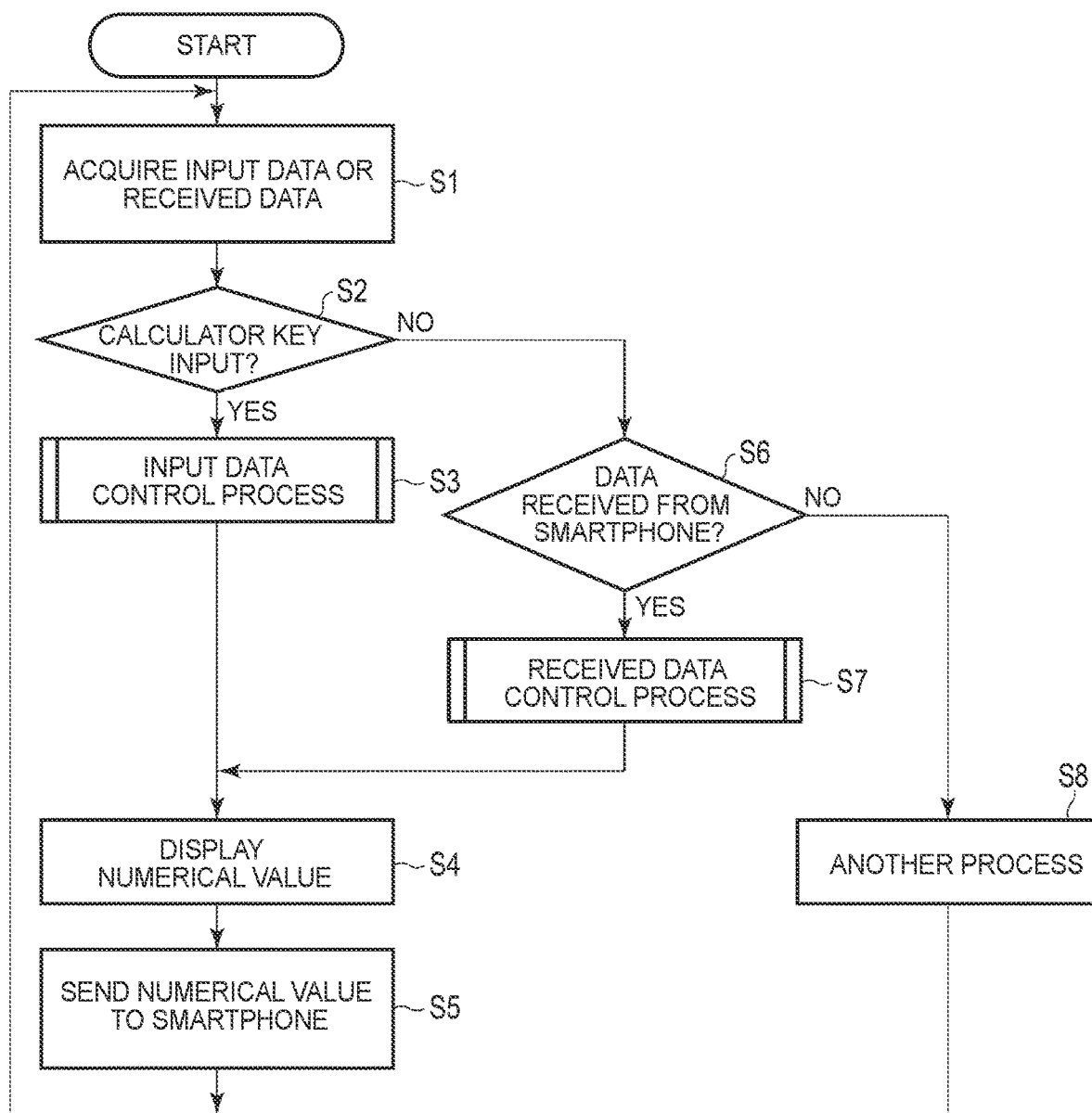
FIG. 3 is a flowchart illustrating the behaviors of the calculator according to the first embodiment.
Figure 4A:
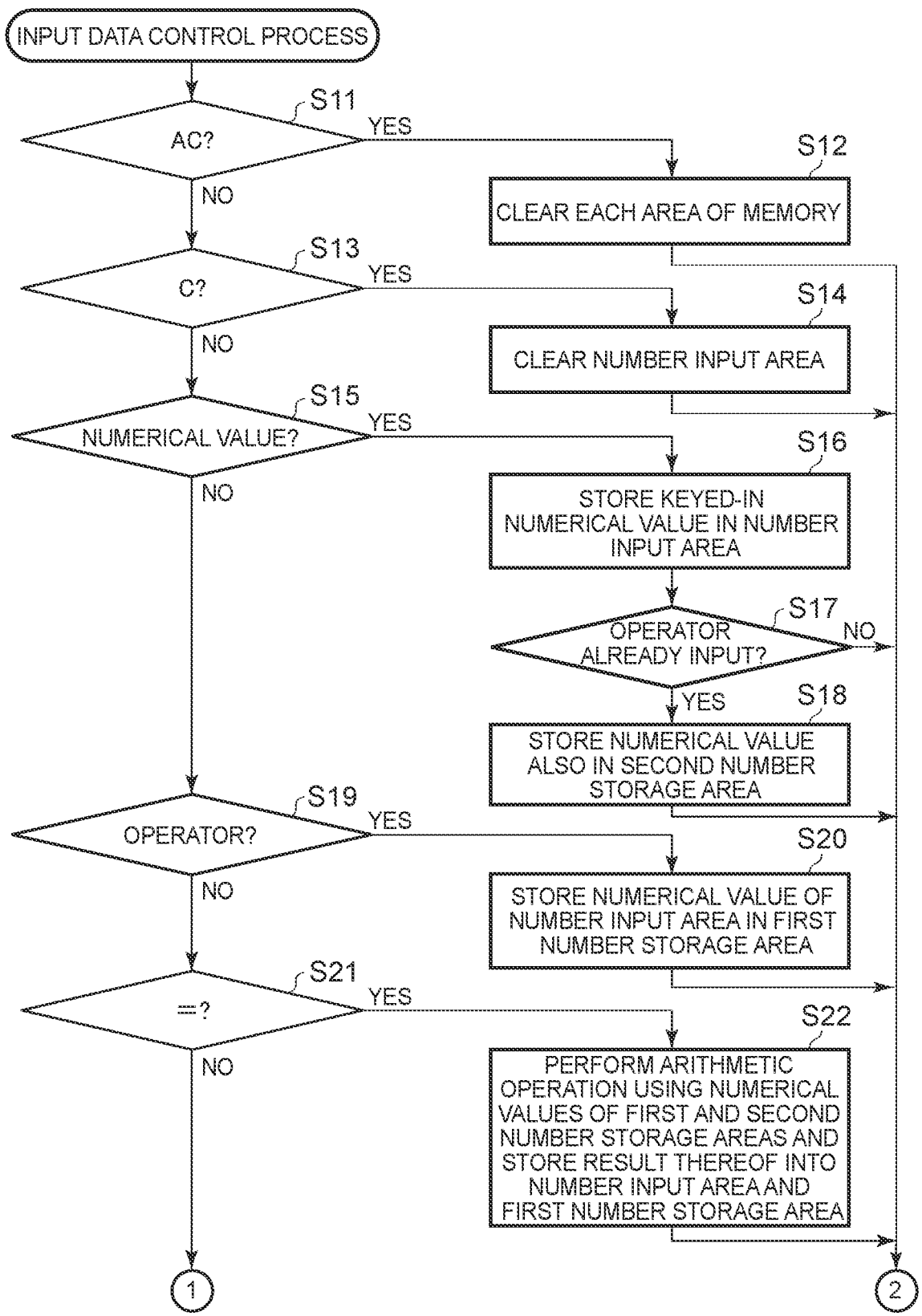
FIG. 4A is a flowchart illustrating the behaviors of the input data control process illustrated in FIG. 3.
Figure 4B:
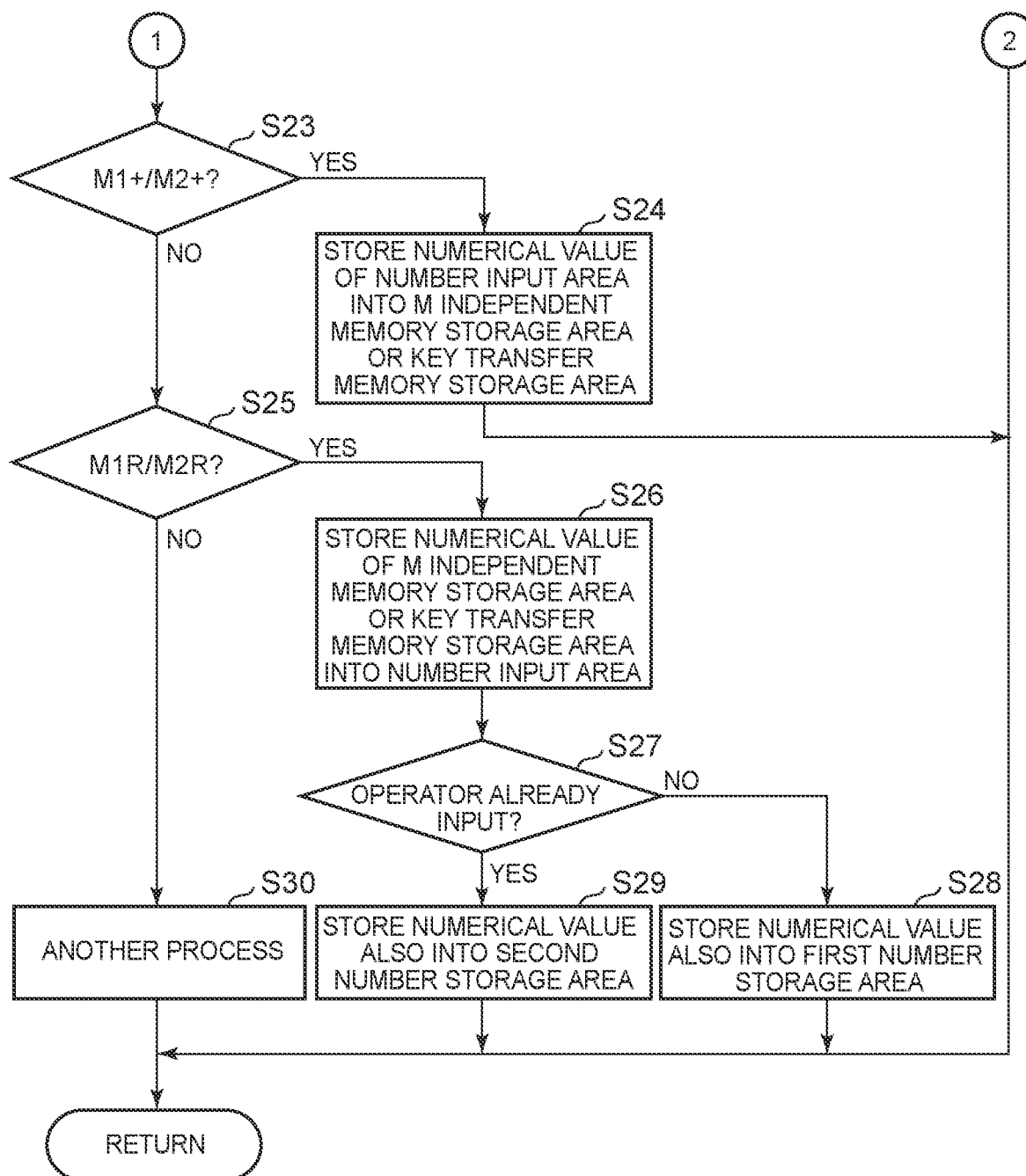
FIG. 4B is a flowchart illustrating the behaviors of the input data control process illustrated in FIG. 3.

The following describes the behaviors of the calculator 10A in the first embodiment. FIGS. 3, 4A, and 4B are flowcharts illustrating the behaviors of the calculator 10A. In this specification, the CPU 19 of the calculator 10A is used to acquire input data having been input from the key input unit 11 or received data having been transferred from the smartphone 50 and to perform processing described later according to the type of the acquired data (for example, a numerical value, an operator, memory function information, data received from the smartphone, or the like). During operation, it is assumed that the BLE key 11e is pressed once and the calculator 10A is synchronized with the smartphone 50.

The CPU 19 acquires input data input from the key input unit 11 or received data transferred from the smartphone 50 (step S1). The acquired data is held in the temporary storage unit of the input buffer 24. The term "input data" here is a value (numerical value) or an operator (for example, "1," "+," AC," [M1+], [M2R], [M2R], [BS] or the like), which is written on the key top of the key input unit 11. In other words, the input data is information on various functions such as a numerical value, an operator, "AC," [M1+], [M2R], and [BS]. The received data is, for example, a numerical value or an operator.

The CPU 19 then determines whether the acquired data is the input data having been input from the key input unit 11. If the CPU 19 determines that data has been acquired from the key input unit 11 (step S2: Yes), the CPU 19 performs an input data control process of performing processing according to the input data (step S3). The details of the input data control process will be described later (FIGS. 4A and 4B).

Subsequently, the CPU 19 causes the display unit 13 to display the numerical value according to a processing result of the input data control process (step S4). If the data is input from the key input unit 11, the CPU 19 sends the numerical value stored in the number input area 25 to the smartphone 50 via the communication unit 17 (step S5). Then, the CPU 19 moves to the process of step S1.

On the other hand, if it is determined that the acquired data is not input data having been input from the key input unit 11 (step S2: No), the CPU 19 determines whether the acquired data is received data transferred from the smartphone 50.

Figure 7:
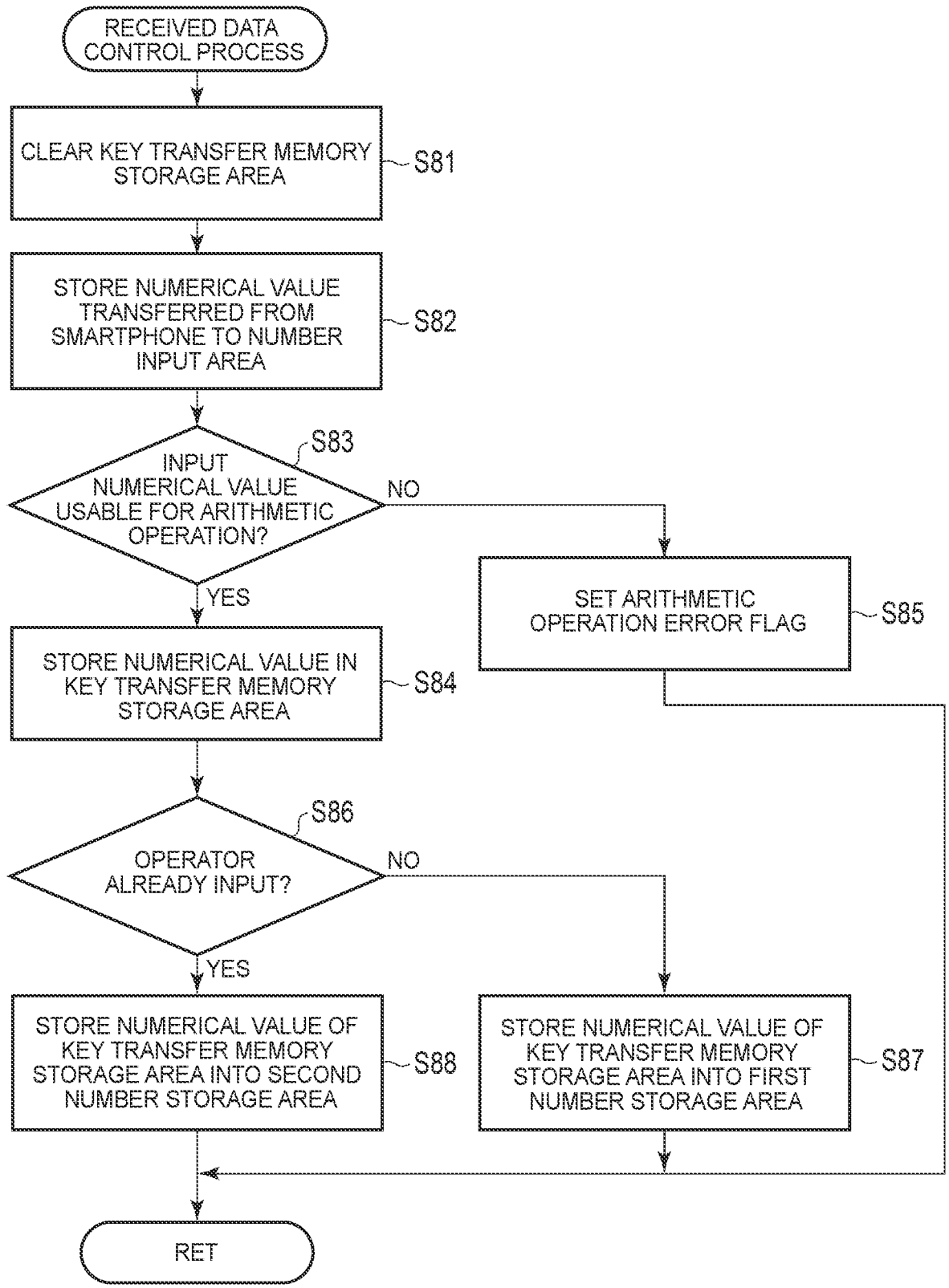
FIG. 7 is a flowchart illustrating a received data control process.

If it is determined that the data is received from the smartphone 50 (step S6: Yes), the CPU 19 performs a received data control process for processing the received data from the smartphone 50 (step S7). The details of the received data control process will be described later (FIG. 7).

If it is determined that the data is not received from the smartphone 50 (step S6: No), the CPU 19 performs another process according to the acquired data (step S8).

Subsequently, description will be made on the behaviors of the input data control process in step S3. FIGS. 4A and 4B are flowcharts each illustrating the behaviors of the input data control process by the calculator 10A.

If the CPU 19 determines that the [AC] key is pressed (step S11: Yes), the CPU 19 clears (erases data from) each area of the memory 21 (step S12). As a result, the number input area 25 and the number storage area 33 are each placed in a state where "0" is stored. In this case, in step S4, the CPU 19 causes the display unit 13 to display the numerical value ("0" in this case) stored in the number input area 25. In step S5, if the data is input from the key input unit 11, the CPU 19 sends the numerical value ("0" in this case) stored in the number input area 25 to the smartphone 50 via the communication unit 17. Then, the CPU 19 moves to the process of step S1.

If the CPU 19 determines that the [C] key is pressed (step S11: Yes), the CPU 19 clears the number input area 25 of the memory 21 (step S14). In this case, the CPU 19 causes the display unit 13 to display the numerical value "0" stored in the number input area 25 and sends the numerical value "0" to the smartphone 50 as in the case where the [AC] key is pressed (steps S4 and S5).

If the CPU 19 determines that the numerical value is input by key input with the numeric key 11a (step S15: Yes), the CPU 19 stores the keyed-in numerical value in the number input area 25. In this case, the CPU 19 displays the numerical value stored in the number input area 25 on the display unit 13 and sends the input numerical value to the smartphone 50 (steps S4 and S5). In the case where a numerical value is input by key input, unless the operator has already been input before the input of this numerical value (step S17: No), the CPU 19 does not fix the input numerical value as a number (numerical value) for use in an arithmetic operation, but only stores the input numerical value in the number input area 25. On the other hand, if the operator has already been input before the input of the numerical value (step S17: Yes), the CPU 19 stores the input numerical value not only in the number input area 25, but also in the second number storage area 332 as a fixed numerical value for use in an arithmetic operation (step S18).

Further, upon an input of an operator ([+] (addition), [−] (subtraction), [×] (multiplication), [+] (division)) for the four arithmetic operations other than "=" by the operation of the calculation key 11b (step S19: Yes), the CPU 19 stores the input operator into the operator information area 35. In addition, the CPU 19 stores the numerical value stored in the number input area 25 as a fixed number (numerical value) used for an arithmetic operation into the first number storage area 331 (step S20). Therefore, as mentioned above, if the operator is input after the numerical value is input (stored in the number input area 25), the numerical value in the number input area 25 is stored into the first number storage area 331. If a numerical value is input thereafter, the numerical value is stored into the second number storage area 332, and the numerical value and the operator used for the arithmetic operation are fixed.

If the operator of "=" is input by operating the calculation key 11b (step S21: Yes), the CPU 19 performs an arithmetic operation according to the operator stored in the operator information area 35 by using the numerical value (number) already stored in the first number storage area 331 and the numerical value already stored in the second number storage area 332 and then stores a result of the arithmetic operation as a new number into the number input area 25 and the first number storage area 331 (step S22).

Thereafter, the CPU 19 displays the numerical value of the number input area 25 on the display unit 13 (step S4) and sends the numerical value resulting from the arithmetic operation to the smartphone 50 (step S5).

In addition, the CPU 19 checks if the input data indicates a memory registration function (one of the memory functions) that has been input by pressing the [M1+] key 81d of the memory key 81 or the [M2+] key 82d of the memory key 82.

If it is determined that the data is input by pressing the [M1+] key 81d, which is a memory storage key (step S23: Yes), the CPU 19 adds the numerical value stored in the number input area 25 to the numerical value stored in the M independent memory storage area 29 and stores the numerical value resulting from the arithmetic operation into the M independent memory storage area 29 (step S24). If it is determined that the data is input by pressing the [M2+] key 82d (step S23: Yes), the CPU 19 adds the numerical value stored in the number input area 25 to the numerical value stored in the key transfer memory storage area 31 and stores the numerical value resulting from the arithmetic operation into the key transfer memory storage area 31 (step S24).

Although omitted in the flowchart illustrated in FIG. 4B, the CPU 19 performs subtraction using the M independent memory storage area 29 or the key transfer memory storage area 31 for the numerical value stored in the number input area 25 if the [M1−] key 81c or the [M2−] key 82c is operated, as in the case where the [M1+] key 81d or the [M2+] key 82d is operated described above. In addition, the CPU 19 checks if the input data indicates a memory read function (one of the memory functions) that has been input by pressing the [M1R] key 81b of the memory key 81 or the [M2R] key 82b of the memory key 82.

If it is determined that the data input by pressing the [M1R] key 81b, which is a memory storage key, (step S25: Yes), the CPU 19 stores the numerical value stored in the M independent memory storage area 29 into the number input area 25 (step S26). If it is determined that the data is input by pressing the [M2R] key 82b (step S25: Yes), the CPU 19 stores the numerical value stored in the key transfer memory storage area 31 into the number input area 25 (step S26).

Moreover, if the [M1R] key 81b or the [M2R] key 82b is operated before the operator is input by operating the calculation key 11b (step S27: No), the CPU 19 stores the numerical value having been stored in the M independent memory storage area 29 or in the key transfer memory storage area 31, not only into the number input area 25 but also into the first number storage area 331 (step S28).

On the other hand, if the [M1R] key 81b or the [M2R] key 82b is operated after the operator is input by operating the calculation key 11b (step S27: Yes), the CPU 19 stores the numerical value having been stored in the M independent memory storage area 29 or in the key transfer memory storage area 31, not only into the number input area 25 but also into the second number storage area 332, as a fixed numerical value used for an arithmetic operation (step S29).

If there is input data other than the above-mentioned key operations (step S25: No), the CPU 19 performs another process according to the input data (step S30). For example, in response to the pressing of the [GT] key 83 of the first function key 11c, the CPU 19 stores the numerical value having been stored in the GT independent memory storage area 27 into the number input area 25 and into the first number storage area 331 or the second number storage area 332.

Here, description is made on the storage procedures for respective areas of the memory 21 according to the input data from the key input unit 11 by the input data control process (FIGS. 4A and 4B) by giving an example. FIG. 5 is a diagram illustrating the storage procedures for respective areas and the contents of the display screen (symbol indications, numerical values on the main screen) at the time of pressing the respective keys, "1," "2," "3," "4," "M1+," "5," "6," "+," "C," "M1R," and "=" of the key input unit 11 in order. As an initial state, the number input area 25, the first number storage area 331, the second number storage area 332, and the M independent memory storage area 29 are cleared (data is erased therefrom) and are each placed in a state where "0" is stored. In addition, it is assumed that the operator information area 35 is placed in a state where nothing is stored as an initial state.

If the "1" key of the numeric key 11a is pressed in the storage procedure (A) of FIG. 5, the CPU 19 acquires the input data (step S1), determines that the numerical value has been input by the key input (step S2: Yes), and stores a numerical value "1" in the number input area 25 (step S15: Yes→step S16). The CPU 19 performs a display update process according to the numerical value "1" stored in the number input area 25 (step S4) and displays a digit "1" on the main screen of the display unit 13. In the same manner, when the "2," "3," and "4" keys of the numeric key 11a are pressed in order in the storage procedures (B), (C), and (D), the CPU 19 stores the numerical values "2," "3," and "4" in order in the number input area 25 (steps S1, S15, and S16). The CPU 19 sequentially updates the digits displayed on the main screen of the display unit 13 to "12," "123," and "1234" each time the numerical values "2," "3," and "4" are input in order (step S4).

Then, if the "M1+" key 81d of the memory key 81 is pressed in the storage procedure (E) of FIG. 5, the CPU 19 acquires the input data (step S1), determines that an instruction of performing the memory function "M1+" has been input (step S23: Yes), stores data indicating the memory function "M1+" into the operator information area 35, adds the numerical value "1234" stored in the number input area 25 to the numerical value "0" stored in the M independent memory storage area 29, and stores an arithmetic operation result "1234" into the M independent memory storage area 29 (step S24). Since "M1+" is stored in the operator information area 35, the CPU 19 displays the memory 1 symbol [M1] 13b on the display unit 13 in the display update process (step S4).

Subsequently, if the "5" and "6" keys of the numeric key 11a are pressed in order in the storage procedures (F) and (G), "5" and "6" are stored in order into the number input area 25 in the same manner as described above (step S15: Yes→S16). The CPU 19 sequentially updates the digits displayed on the main screen of the display unit 13 to "5" and "56" every time the numerical values "5" and "6" are input in order (step S4).

Subsequently, if the "+" key of the calculation key 11b is pressed in the storage procedure (H) of FIG. 5, the CPU 19 acquires the input data (step S1), determines that the operator "+" is input (step S19: Yes), stores the operator "+" in the operator information area 35, fixes the numerical value "56" that has been input until then as a number, and stores the numerical value "56" stored in the number input area 25 into the first number storage area 331 (step S20). In the display update process, the CPU 19 displays the numerical value "56" on the display unit 13 and displays the operator symbol 13d that corresponds to [+] (addition) since the operator "+" is stored in the operator information area 35 (step S4).

Subsequently, if the clear key ([C] key) is pressed (step S13: Yes) in the storage procedure (I) of FIG. 5, the CPU 19 clears (erases data from) the number input area 25 so as to be placed in a state where "0" is stored (step S14) and displays "0" on the main screen of the display unit 13 in the display update process (step S4). At this time, the numerical values stored in the first number storage area 331 and in the M independent memory storage area 29 are not changed. Additionally, if the [M1C] key 81a is pressed, the CPU 19 clears not only the number input area 25 but also the M independent memory storage area 29.

Subsequently, if the [M1R] key 81b is pressed (step S25: Yes) in the storage procedure (J) of FIG. 5, the CPU 19 stores the numerical value "1234" stored in the M independent memory storage area 29 into the number input area 25 (step S26) and stores the numerical value "1234" into the second number storage area 332 (step S29) since the operator has already been input (step S27: Yes). If the operator is not input yet (step S27: No), the numerical value "1234" is stored in the first number storage area 331 (step S28).

Subsequently, if the "=" key of the calculation key 11b is pressed in the storage procedure (K) of FIG. 5, the CPU 19 acquires the input data (step S1), determines that the operator "=" is input (step S21: Yes), and stores the operator "=" in the operator information area 35. The CPU 19 performs an arithmetic operation (an addition corresponding to the operator "+") using the number "56" stored in the first number storage area 331 and the numerical value "1234" stored in the second number storage area 332 to find a numerical value "1290" resulting from the arithmetic operation and stores the numerical value "1290" in the number input area 25 and in the first number storage area 331 (step S22). In addition, the CPU 19 performs an arithmetic operation of adding the numerical value "1290" resulting from the arithmetic operation to the numerical value stored in the GT independent memory storage area 27 and then stores the numerical value resulting from the arithmetic operation to the GT independent memory storage area 27. In the display update process, the CPU 19 displays the numerical value "1290" on the display unit 13 and displays the operator symbol 13d corresponding to [=] (equal) since the operator "=" is stored in the operator information area 35. Moreover, the CPU 19 displays a grand total symbol [GT] 13a according to the storage of the numerical value in the GT independent memory storage area 27 (step S4).

In the above description, the case where the [M1R] key 81b is pressed after the operator is input is taken as an example. If the [M1R] key 81b is pressed before the operator is input, however, the CPU 19 stores the numerical value, which has been stored in the M independent memory storage area 29, into the first number storage area 331. In this case, the CPU 19 is able to perform an arithmetic operation by using the numerical value stored in the first number storage area 331 and the numerical value stored in the second number storage area 332, which was input after the input of the operator.

In the above description, the case where the memory key 81 is operated is taken as an example. If, however, the memory key 82 (the ([M2C] key 82a, the [M2R] key 82b, the [M2−] key 82c, or the [M2+] key 82d)) is operated, the key transfer memory storage area 31 is used, instead of the M independent memory storage area 29, to perform the same memory function as above.

Furthermore, it is also possible to perform an arithmetic operation using both the memory-calculated numerical value using the memory key 81 and the memory-calculated numerical value using the memory key 82.

Figure 6:
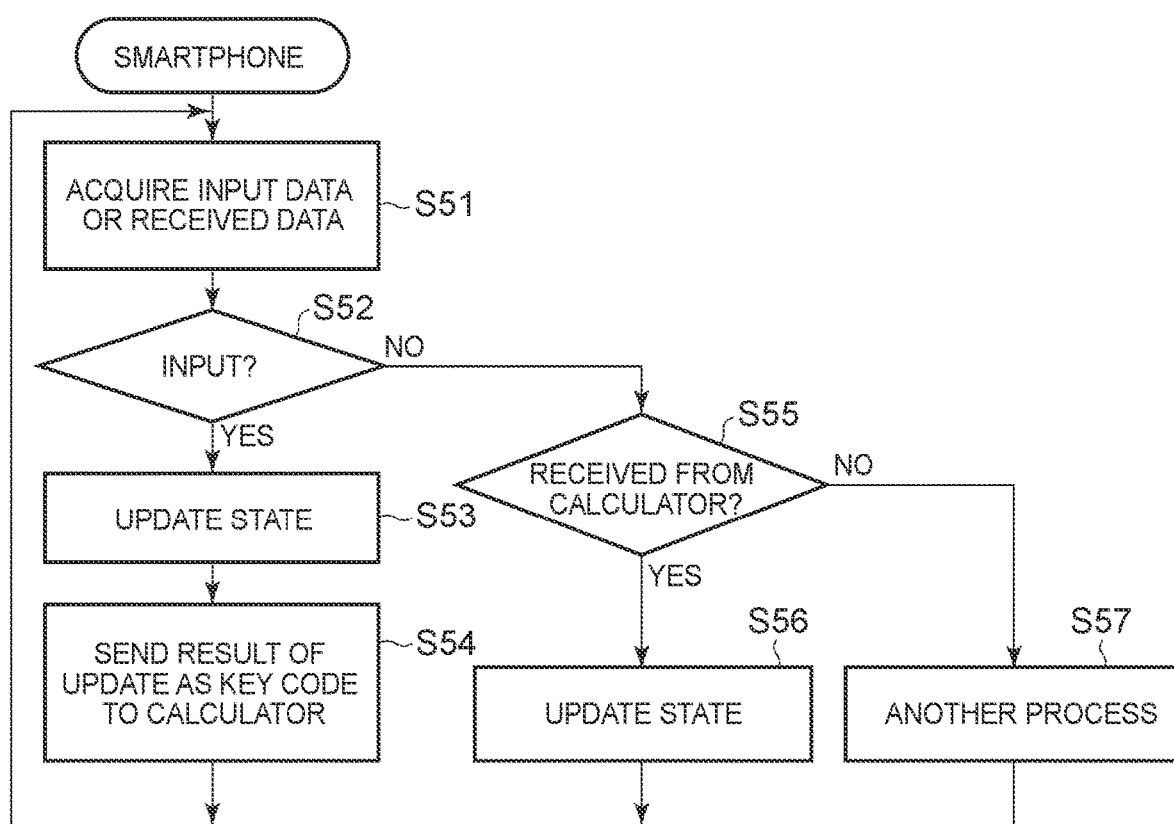
FIG. 6 is a flowchart illustrating the behaviors of the smartphone.

The following describes the behaviors of the smartphone 50, which is performed when the calculator 10A sends a numerical value to the smartphone 50 in step S5. FIG. 6 is a flowchart illustrating the behaviors of the smartphone 50.

The CPU 59 acquires input data, which has been input from the touch panel 51, or received data, which has been transferred from the calculator 10A (step S51). The input data here is, for example, a numerical value or an operator. The received data is, for example, a value (numerical value) displayed on the display unit 13 of the calculator 10A.

Then, the CPU 59 checks if the acquired data is input from the touch panel 51. If it is determined that the input is made on the touch panel 51 (step S52: Yes), the CPU 59 updates the state of the smartphone 50 (step S53). For example, the CPU 59 stores the input data from the touch panel 51 into the memory 61 and reflects it on the display unit 53. The input data may be a numerical value or may be an instruction for a predetermined process such as arithmetic processing. If it is an instruction for a predetermined process, the process result data is able to be stored in the memory 61 and reflected on the display unit 53. Subsequently, the CPU 59 transfers the updated content (input data or process result data) as a key code to the calculator 10A via the communication unit 57 (step S54). As a result, data is received from the smartphone 50 on the calculator 10A (step S1). Then, the CPU 59 returns to the process of step S51.

On the other hand, if it is determined that no input has been made on the touch panel 51 (step S52: No), the CPU 59 checks if the data acquired in step S51 was received from the calculator 10A.

If it is determined that the data is received from the calculator 10A (step S55: Yes), the CPU 59 updates the state of the smartphone 50 (step S56). For example, the CPU 59 stores the received data in the memory 61 and reflects it on the display unit 53. Then, the CPU 59 returns to the process of step S51.

If it is determined that the data is not received from the calculator 10A (step S55: No), the CPU 59 performs another process according to the input data or the received data (step S57). In this specification, for example, the CPU 59 performs a process of changing the font size of a value displayed on the display unit 53, a process of switching a usage mode of the smartphone 50 to a calculator mode and then displaying the keyboard layout of the calculator on the display unit 53, a process of returning the content displayed on the display unit 53 from a currently-displayed first content to a second content displayed before the first content, a process of clearing the input data and received data already stored in the memory 61, and so on. Then, the CPU 59 returns to the process of step S51.

Subsequently, the received data control process in the first embodiment will be described with reference to the flowchart illustrated in FIG. 7. In this description, it is assumed that the received data received from the smartphone 50 is, for example, a numerical value used for an arithmetic operation performed by the calculator 10A.

The CPU 19 stores numerical data in the buffer area 24 upon receiving the numerical data from the smartphone 50 by the communication unit 17 (step S1). After storing the numerical data in the buffer area 24, the CPU 19 clears (erases) the numerical value already stored in the key transfer memory storage area 31 (step S81). As a result, the key transfer memory storage area 31 is placed in a state where "0" is stored.

Then, the CPU 19 temporarily stores the numerical value, which is the received data transferred from the smartphone 50, in the number input area 25 (step S82).

Subsequently, the CPU 19 checks if the numerical value stored in the number input area 25 is usable for an arithmetic operation. For example, in the case where the CPU 19 receives data that contains a numerical value but is not subject to the arithmetic operation such as, for example, data indicating date "2019 Dec. 6," the CPU 19 determines that it is unusable for an arithmetic operation (step S83: No). Furthermore, the data that is determined to be unusable for an arithmetic operation includes, for example, data that indicates a numerical value with the number of digits that exceeds a preset limit on the number of digits and data that contains data other than a numerical value.

In this case, the CPU 19 sets an arithmetic operation error flag in the key transfer memory storage area 31 (step S85) and ends the received data control process (return). After the end of the received data control process, the CPU 19 performs the display update process in step S4 of FIG. 3 to display a character "Err" indicating an error in the main screen area of the display unit 13 in response to the arithmetic operation error flag. On the other hand, if it is determined that the numerical value stored in the number input area 25 is usable for an arithmetic operation (step S83: Yes), the CPU 19 stores the numerical value, which has been stored in the number input area 25, into the key transfer memory storage area 31 (step S84). In other words, the CPU 19 overwrites "0" stored in the key transfer memory storage area 31 in step S81 with the numerical value stored in the number input area 25 in step S82.

At this time, the CPU 19 determines whether the operator has already been input by referring to the operator information area 35. Unless the operator has already been input (step S86: No), the CPU 19 stores the numerical value, which has been stored in the key transfer memory storage area 31, into the first number storage area 331 and into the number input area 25 (step S87). The phrase "to store the numerical value into the first number storage area 331 and into the number input area 25" means that numerical values already stored in the first number storage area 331 and in the number input area 25 are overwritten with the numerical value stored in the key transfer memory storage area 31.

On the other hand, if the operator has already been input (step S86: Yes), the CPU 19 stores the numerical value, which has been stored in the key transfer memory storage area 31, into the second number storage area 332 and into the number input area 25 (step S88).

In this manner, the CPU 19 stores the numerical value received from the smartphone 50 in the first number storage area 331 or the second number storage area 332 so that the numerical value can be calculated by an arithmetic operation, and then the CPU 19 ends the data control process. The numerical value input by operating the numeric key 11a is fixed as a number by inputting the operator by operating the calculation key 11b and is stored in the first number storage area 331 or the second number storage area 332. The numerical value received from the smartphone 50, however, is stored in the first number storage area 331 or the second number storage area 332 without awaiting the input of the operator by operating the calculation key 11b in the received data control process.

Upon completing the received data control process, the CPU 19 performs the display update process to display the numerical value received from the smartphone 50 and displays the memory 2 symbol [M2] 13c on the display unit 13 to provide notice of the numerical value received from the smartphone 50 and stored in the first number storage area 331 or the second number storage area 332 (step S4). Therefore, the user of the calculator 10A is able to easily confirm that the numerical value usable for an arithmetic operation has been received from the smartphone 50 and then input as a target of the arithmetic operation (stored in the first number storage area 331 or the second number storage area 332).

In the above description, it is checked if the numerical value stored in the number input area 25 is usable for an arithmetic operation and, if it is determined that the numerical value is usable for an arithmetic operation (step S83: Yes), the numerical value is stored in the first number storage area 331 or the second number storage area 332 (step S87, S88) and then the memory 2 symbol [M2] 13c is displayed on display unit 13. If, however, it is unnecessary to check the numerical value received from the smartphone 50, information indicating that the numerical value stored in the number input area 25 is stored (for example, the memory 2 symbol [M2] 13c) may be displayed on the display unit 13 at the time of storage of the numerical value in the number input area 25, is stored.

For example, if only the numerical value usable for an arithmetic operation is received from the smartphone 50, the process of checking if the numerical value is usable for an arithmetic operation is considered to be unnecessary (step S83 in FIG. 7). In this case, it is assumed that the smartphone 50 shall determine, for example, whether the numerical data is usable for an arithmetic operation and sends only the numerical data determined to be usable for an arithmetic operation to the calculator 10A.

In such a case, the numerical value usable for an arithmetic operation and stored in the number input area 25 is stored in the first number storage area 331 or the second number storage area 332 and used for an arithmetic operation. Therefore, at the time of storage of the numerical value in the number input area 25, the same effect can be obtained by displaying the memory 2 symbol [M2] 13c on the display unit 13 in the same manner as described above.

Subsequently, description will be made on a concrete example of receiving numerical data from the smartphone 50 and performing an arithmetic operation.

Figure 9:
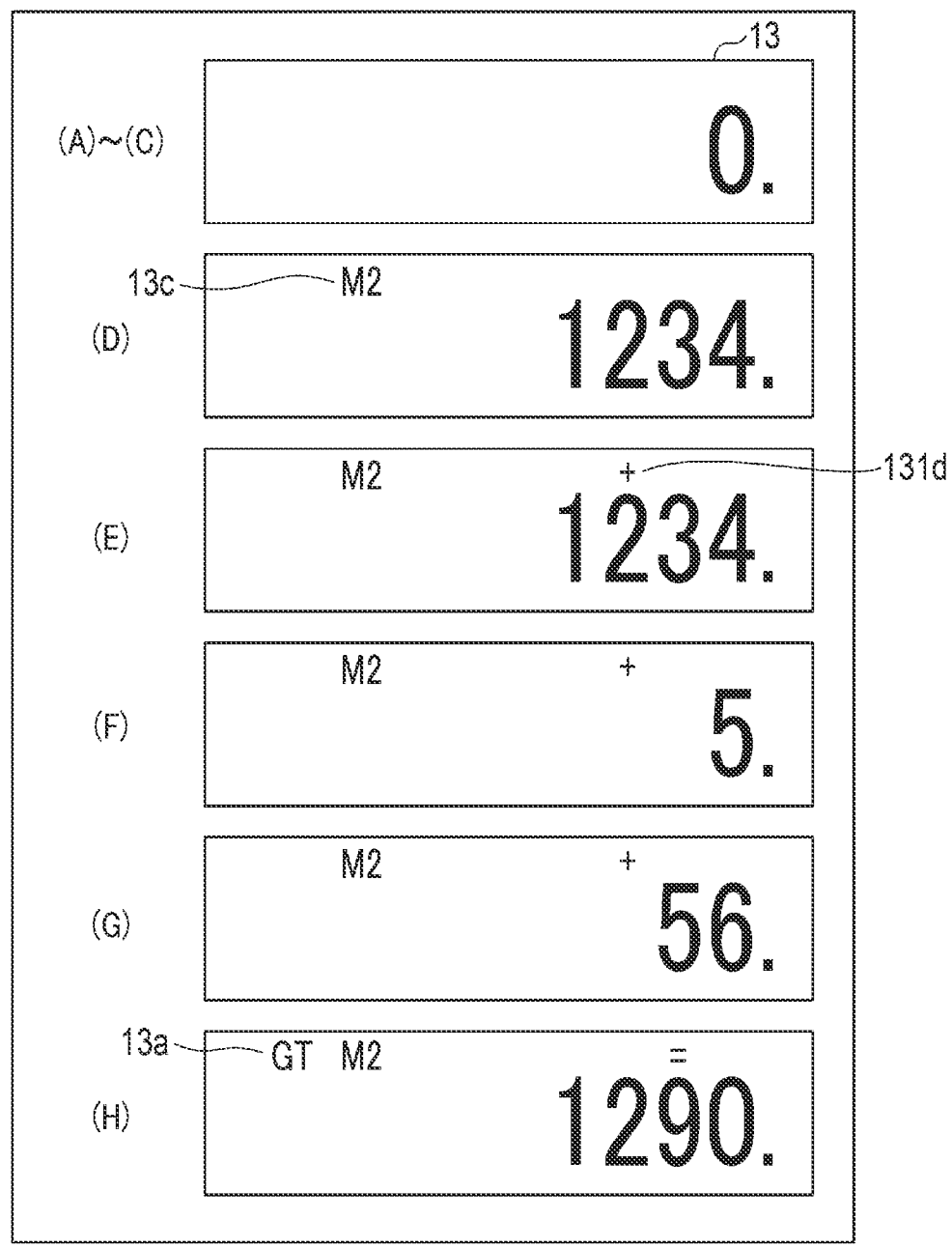
FIG. 9 is a diagram illustrating sample displays corresponding to the storage procedures illustrated in FIG. 8.

First, description will be made on a case where the numerical value used for an arithmetic operation is received from the smartphone 50 before the operator is input by operating the calculation key 11b. FIG. 8 is a diagram illustrating storage procedures (A) to (H) for the respective areas of the memory 21 and the contents of the display screen (symbol indications, numerical values on the main screen). FIG. 9 is a diagram illustrating sample displays of the display unit 13 corresponding to the respective storage procedures (A) to (H) illustrated in FIG. 8.

The storage procedures (A) to (D) in FIG. 8 illustrate the contents stored in respective areas when the numerical value "1234" is input from the smartphone 50. The storage procedures (E) to (H) in FIG. 8 illustrate the storage contents of the respective areas when the "+," "5," "6," and "=" keys are pressed in order in the key input unit 11 after the received data control process.

As an initial state, it is assumed that "0" is stored in the number input area 25, the first number storage area 331, and the second number storage area 332. In addition, as an initial state, it is assumed that a predetermined value (numerical value) is stored in the key transfer memory storage area 31.

Furthermore, it is assumed that the operator information area 35 is placed in a state where nothing is stored as an initial state.

The CPU 19 temporarily stores the numerical data "1234" in the buffer area 24 upon receiving the numerical data "1234" from the smartphone 50 via the communication unit 17. In the storage procedure (A), the CPU 19 clears the numerical value stored in the key transfer memory storage area 31 and stores "0" in the key transfer memory storage area 31 (step S81).

Subsequently, in the storage procedure (B), the CPU 19 stores the numerical data "1234" stored in the buffer area 24 into the number input area 25 (step S82), where the numerical value "1234" is determined to be a numerical value usable for an arithmetic operation (step S83: Yes).

In the storage procedure (C), the CPU 19 stores "1234" stored in the number input area 25 into the key transfer memory storage area 31 (step S84) and stores data indicating the memory function "M2+" corresponding to the symbol "M2+" into the operator information area 35. Specifically, the CPU 19 stores data, corresponding to a symbol for providing notice of having received the numerical data from the smartphone 50, into the operator information area 35.

While the storage procedures (A) to (C) are being performed, the display unit 13 still displays the numerical value "0" on the main screen as illustrated in (A) to (C) of FIG. 9.

In the storage procedure (D), the CPU 19 stores the numerical value "1234," which has been stored in the key transfer memory storage area 31, into the number input area 25 and the first number storage area 331 (step S87). The CPU 19 stores the numerical value "1234" in the number input area 25 and in the first number storage area 331 and then moves to the process of step S4. As illustrated in (D) of FIG. 9, the CPU 19 displays the numerical value "1234" stored in the number input area 25 on the main screen of the display unit 13 and displays the memory 2 symbol [M2] 13c according to the data stored in the operator information area 35.

As a result, the user of the calculator 10A is able to easily confirm that the numerical value usable for an arithmetic operation has been received from the smartphone 50 and then input as a target of an arithmetic operation (stored in the first number storage area 331).

Subsequently, if the "+" key of the key input unit 11 is pressed in the storage procedure (E), the CPU 19 acquires the input data (step S1) and stores the operator "+" into the operator information area 35 (step S19: Yes→step S20). At this point of time, "1234" is still stored in each of the number input area 25, the first number storage area 331, and the key transfer memory storage area 31. The CPU 19 displays the operator symbol 13d corresponding to [+] (addition) as illustrated in (E) of FIG. 9 since the operator "+" is stored in the operator information area 35 (step S4).

If the "5" key of the key input unit 11 is pressed in the storage procedure (F), the CPU 19 acquires the input data (step S1) and stores the numerical value "5" in the number input area 25 (step S15: Yes→S16) and stores the numerical value "5" in the second number storage area 332 since the operator has already been input (step S18). The CPU 19 displays the numerical value "5" stored in the number input area 25 on the main screen of the display unit 13 (step S4), as illustrated in (F) of FIG. 9. Subsequently, if the "6" key of the key input unit 11 is pressed in the storage procedure (G), the CPU 19 acquires the input data (step S1), stores the numeral value "6" in the number input area 25 (step S15: Yes→S16), and stores the numerical value "6" in the second number storage area 332 (step S18). Since "5" has already been stored in the number input area 25, "56" is stored in the number input area 25. Moreover, since "5" has already been stored in the second number storage area 332, "56" is stored in the second number storage area 332. The CPU 19 displays the numerical value "56" stored in the number input area 25 on the main screen of the display unit 13 as illustrated in (G) of FIG. 9.

If the "=" key of the key input unit 11 is pressed in the storage procedure (H), the CPU 19 acquires the input data (step S1), stores "=" (equal) in the operator information area 35, and performs an arithmetic operation (addition, here) using "1234" stored in the first number storage area 331 and "56" stored in the second number storage area 332 to find the numeral value "1290" resulting from the arithmetic operation. The CPU 19 stores the numerical value "1290" resulting from the arithmetic operation in the number input area 25 and in the first number storage area 331 (step S21: Yes→S22). In addition, the CPU 19 performs an arithmetic operation of adding the numerical value "1290" resulting from the arithmetic operation to the numerical value stored in the GT independent memory storage area 27 and stores the numerical value resulting from the arithmetic operation into the GT independent memory storage area. At this time, "1234" is still stored in the key transfer memory storage area 31. As illustrated in (H) of FIG. 9, the CPU 19 displays the numerical value "1290" resulting from the arithmetic operation on the main screen of the display unit 13 and displays the operator symbol 13d corresponding to [=] (equal) since the operator "=" is stored in the operator information area 35. In addition, the CPU 19 displays the grand total symbol [GT] 13a according to the storage of the numerical value into the GT independent memory storage area 27 (step S4).

Thus, before the operator is input in the calculator 10A, the numerical value received from the smartphone 50 is stored in the key transfer memory storage area 31 and then stored in the first number storage area 331. After the operator is input, the numerical value is then used for an arithmetic operation with the numerical value stored in the second number storage area 332 by a key operation of the calculator 10A. Therefore, the correct arithmetic operation result can be obtained in the arithmetic operation based on the numerical value received from the smartphone 50.

Subsequently, description is made on a case where the numerical value used for an arithmetic operation is received from the smartphone 50 after an operator is input by operating the calculation key 11b. FIG. 10 is a diagram illustrating the storage procedures (A) to (H) for respective areas of the memory 21 and the contents of the display screen (symbol indications, numerical values on the main screen). The numerical values and symbols in the display unit 13 are not illustrated since they are assumed to be displayed in the same manner as in FIG. 9.

The storage procedures (A) to (C) and (H) in FIG. 10 indicate the contents stored in the respective areas when the "5," "6," "+," and "=" keys are pressed in the key input unit 11, and the storage procedures (D) to (G) in FIG. 10 illustrate the contents stored in the respective areas when the numerical value "1234" is input from the smartphone 50. The following description will mainly describe the parts different from the storage procedures described with reference to FIG. 8.

If the "5" and "6" keys of the key input unit 11 are pressed in order in the storage procedures (A) and (B), the CPU 19 acquires the input data (step S1) and stores numerical values "5" and "6" in order in the number input area 25 (step S15: Yes→S16). The CPU 19 displays "5" and "56" in order on the main screen of the display unit 13 according to the numerical values "5" and "6" being stored in order into the number input area 25 (step S4). An operator is not input here and the number is not fixed, and therefore the numerical value "56" stored in the number input area 25 is not stored in the first number storage area 331.

Subsequently, if the "+" key of the key input unit 11 is pressed in the storage procedure (C), the CPU 19 acquires the input data (step S1) and stores the operator "+" into the operator information area 35. The CPU 19 fixes the number by the input of the operator "+" and stores the numerical value "56" stored in the number input area 25 into the first number storage area 331 (step S19: Yes→S20).

Subsequently, if the communication unit 17 receives the numerical data "1234" from the smartphone 50 after the operator is input, the CPU 19 temporarily stores the numerical data "1234" in the buffer area 24. In the storage procedure (D), the CPU 19 clears the numerical value stored in the key transfer memory storage area 31 and stores "0" in the key transfer memory storage area 31 (step S81).

Then, in the storage procedure (E), the CPU 19 stores the numerical data "1234" stored in the buffer area 24 into the number input area 25 (step S82), where the numerical value "1234" is determined to be a numerical value usable for an arithmetic operation (step S83: Yes).

In the storage procedure (F), the CPU 19 stores "1234" stored in the number input area 25 into the key transfer memory storage area 31 (step S84) and stores data indicating the memory function "M2+" corresponding to the symbol "M2+" into the operator information area 35. Specifically, the CPU 19 stores data, corresponding to the symbol for providing notice of having received the numerical data from the smartphone 50, into the operator information area 35.

In the storage procedure (G), the CPU 19 stores the numerical value "1234," which has been stored in the key transfer memory storage area 31, into the number input area 25 and the second number storage area 332 (step S88). In other words, since the numerical value "1234" is received from the smartphone 50 after the operator "+" is input (step S86: Yes), the numerical value is stored in the second number storage area 332 so that it can be used for an arithmetic operation. The CPU 19 stores the numerical value "1234" in the number input area 25 and in the second number storage area 332 and then moves to the process of step S4 to display the numerical value "1234" stored in the number input area 25 on the main screen of the display unit 13 and to display the memory 2 symbol [M2] 13c according to data stored in the operator information area 35.

Thereby, the user of the calculator 10A is able to easily confirm that a numerical value usable for an arithmetic operation has been received from the smartphone 50 and input as a target of an arithmetic operation (stored into the second number storage area 332) after the operator is input by operating the "+" key.

If the "=" key of the key input unit 11 is pressed in the storage procedure (H), the CPU 19 acquires the input data (step S1), stores "=" (equal) in the operator information area 35, and performs an arithmetic operation (addition, here) with "56" stored in the first number storage area 331 and "1234" stored in the second number storage area 332 to find the numerical value "1290" resulting from the arithmetic operation (step S21: Yes→S22). From here forward, the same process as for the storage procedure (H) in FIG. 10 described above is performed.

Thus, after the operator is input in the calculator 10A, the numerical value received from the smartphone 50 is stored in the key transfer memory storage area 31 and then stored in the second number storage area 332, so that it is used for an arithmetic operation with the numerical value previously stored in the first number storage area 331 by the key operation of the calculator 10A. Therefore, a correct arithmetic operation result can be obtained in the arithmetic operation based on the numerical value received from the smartphone 50.

The following describes modifications (1) and (2) using storage procedures different from the storage procedures illustrated in FIGS. 8 and 10 on the basis of the storage procedures illustrated in FIGS. 11 and 12.

In the storage procedures illustrated in FIGS. 8 and 10, the calculator 10A stores the numerical value, which has been received from the smartphone 50, into the key transfer memory storage area 31 and then into the first number storage area 331 or the second number storage area 332. In the modifications (1) and (2) described later, the numerical value received from the smartphone 50 is stored in the first number storage area 331 or the second number storage area 332 without using the key transfer memory storage area 31.

First, description is made on a modification (1) in which a numerical value used for an arithmetic operation is received from the smartphone 50 before an operator is input by operating the calculation key 11b. FIG. 11 is a diagram illustrating the storage procedures (A) to (G) for respective areas of the memory 21 and the contents of the display screen (symbol indications, numerical values on the main screen). The storage procedures (A) to (C) in FIG. 11 correspond to the storage procedures (A) to (D) illustrated in FIG. 8, and the storage procedures (D) to (G) in FIG. 11 correspond to the storage procedures (E) to (H) illustrated in FIG. 8. The following description mainly describes the parts that differ from the storage procedures described with reference to FIG. 8.

Upon receiving numerical data "1234" from the smartphone 50 via the communication unit 17, the CPU 19 temporarily stores the numerical data "1234" in the buffer area 24. Since an operator is not stored yet in the operator information area 35, the CPU 19 clears the numerical value stored in the first number storage area 331 and stores "0" in the first number storage area 331 in the storage procedure (A) (step S81).

Then, in the storage procedure (B), the CPU 19 stores the numerical data "1234," which has been stored in the buffer area 24, into the number input area 25, where the numerical value "1234" is determined to be a numerical value usable for an arithmetic operation (step S83: Yes).

In the storage procedure (C), the CPU 19 stores "1234," which has been stored in the number input area 25, into the first number storage area 331 and stores data indicating the memory function "M2+" corresponding to the symbol "M2+" into the operator information area 35. Specifically, the CPU 19 stores data, corresponding to the symbol for providing notice of having received the numerical data from the smartphone 50, into the operator information area 35.

The CPU 19 stores the numerical value "1234" in the number input area 25 and in the first number storage area 331 and then moves to the process of step S4 to display the numerical value "1234" stored in the number input area 25 on the main screen of the display unit 13 and to display the memory 2 symbol [M2] 13c according to the data stored in the operator information area 35.

Thereby, the user of the calculator 10A is able to easily confirm that the numerical value usable for an arithmetic operation has been received from the smartphone 50 and then input as a target of an arithmetic operation (stored in the first number storage area 331).

Hereinafter, the description of the storage procedures (D) to (G) in FIG. 11 is omitted since they are performed in the same manner as the storage procedures (E) to (H) illustrated in FIG. 8.

Subsequently, description is made on a modification (2) in the case where the numerical value used for an arithmetic operation is received from the smartphone 50 after the operator is input by operating the calculation key 11b. FIG. 12 is a diagram illustrating the storage procedures (A) to (G) for respective areas of the memory 21 and the contents of the display screen (symbol indications, numerical values on the main screen). The storage procedures (A) to (C) in FIG. 12 correspond to the storage procedures (A) to (C) illustrated in FIG. 10, and the storage procedures (D) to (G) in FIG. 12 correspond to the storage procedures (D) to (H) illustrated in 10. The following description mainly describes the parts that differ from the storage procedures described with reference to FIG. 10.

The description of the storage procedures (A) to (C) in FIG. 12 is omitted assuming that they are performed in the same manner as the storage procedures (A) to (C) illustrated in FIG. 10.

Subsequently, when the communication unit 17 receives the numerical data "1234" from the smartphone 50 after an operator is input, the CPU 19 temporarily stores the numerical data "1234" in the buffer area 24. Since the operator has already been stored in the operator information area 35, the CPU 19 clears the numerical value stored in the second number storage area 332 and stores "0" in the second number storage area 332 in the storage procedure (D).

Then, in the storage procedure (E), the CPU 19 stores the numerical data "1234," which has been stored in the buffer area 24, into the number input area 25, where the numerical value "1234" is determined to be a numerical value usable for an arithmetic operation (step S83: Yes).

In the storage procedure (F), the CPU 19 stores "1234," which has been stored in the number input area 25, into the second number storage area 332 (step S84) and stores data indicating the memory function "M2+" corresponding to the symbol "M2+" into the operator information area 35. Specifically, the CPU 19 stores data, corresponding to the symbol for providing notice of having received the numerical data from the smartphone 50, into the operator information area 35.

The CPU 19 stores the numerical value "1234" in the number input area 25 and in the second number storage area 332 and then moves to the process of step S4 to display the numerical value "1234" stored in the number input area 25 on the main screen of the display unit 13 and to display the memory 2 symbol [M2] 13c according to the data stored in the operator information area 35.

Thereby, the user of the calculator 10A is able to easily confirm that a numerical value usable for an arithmetic operation has been received from the smartphone 50 and input as a target of the arithmetic operation (stored into the second number storage area 332) after the operator is input by operating the "+" key.

The description of the storage procedure (H) in FIG. 12 is omitted since it is performed in the same manner as the storage procedure (H) illustrated in FIG. 10.

Thus, in the modifications (1) and (2), the numerical value received from the smartphone 50 is stored in the first number storage area 331 or the second number storage area 332 depending on whether the operator has already been input or has not been input yet in the calculator 10A and then the numerical value is used for an arithmetic operation according to the operator and the numerical value input by the key operation of the calculator 10A. Therefore, even if the key transfer memory storage area 31 for storing the numerical value received from the smartphone 50 is not used, a correct arithmetic operation result can be obtained in the arithmetic operation based on the numerical value received from the smartphone 50.

Subsequently, description is made on a case where a numerical value unusable for an arithmetic operation has been received from the smartphone 50, by using the storage procedures illustrated in FIGS. 13 and 14. In FIGS. 13 and 14, there is a limit on the number of digits in the numerical value usable for an arithmetic operation. For example, a numerical value with four or more digits is determined to be a numerical value unusable for an arithmetic operation in the description.

FIG. 13 is a diagram illustrating the storage procedures (A) to (D) for respective areas of the memory 21 and the contents of the display screen (symbol indications, error indications of the main screen). The storage procedures (A) to (D) in FIG. 13 illustrate examples in the case where a numerical value is received from the smartphone 50 before the operator is input in the calculator 10A. The procedures (A) to (D) in FIG. 13 correspond to the storage procedures illustrated in FIG. 8, respectively. The following description mainly describes the parts that differ from the storage procedures described with reference to FIG. 8.

Upon receiving the numerical data "1234" from the smartphone 50 via the communication unit 17, the CPU 19 temporarily stores the numerical data "1234" in the buffer area 24. Since the operator is not stored yet in the operator information area 35, the CPU 19 clears the numerical value stored in the first number storage area 331 and stores "0" in the first number storage area 331 in the storage procedure (A) (step S81).

Subsequently, in the storage procedure (B), the CPU 19 stores the numerical data "1234" stored in the buffer area 24 into the number input area 25. Then, the CPU 19 checks if the numerical value "1234" stored in the number input area 25 is usable for an arithmetic operation. Since the numerical value "1234" exceeds the limit of three digits on the number of digits, the CPU 19 determines that the numerical value "1234" is unusable for an arithmetic operation (step S83: No).

In this case, in the storage procedure (C), the CPU 19 sets an arithmetic operation error flag in the key transfer memory storage area 31 (step S85) and ends the received data control process (return). In the storage procedure (D), the CPU 19 performs the display update process after the end of the received data control process to display a character "Err" indicating an error in the area of the main screen of the display unit 13 according to the arithmetic operation error flag.

FIG. 14 is a diagram illustrating the storage procedures (A) to (H) for respective areas of the memory 21 and the contents of the display screen (symbol indications, error indications of the main screen). The storage procedures (A) to (H) in FIG. 14 illustrate examples in the case where a numerical value is received from the smartphone 50 after an operator is input in the calculator 10A. The storage procedures (A) to (H) in FIG. 14 correspond to the storage procedures (A) to (H) illustrated in FIG. 10. The following description mainly describes the parts that differ from the storage procedures described with reference to FIG. 10.

The description of the storage procedures (A) to (E) in FIG. 14 is omitted assuming that they are performed in the same manner as the storage procedures (A) to (D) illustrated in FIG. 10.

Subsequently, in the storage procedure (F), the CPU 19 stores the numerical data "1234" stored in the buffer area 24 into the number input area 25 (step S82). Then, the CPU 19 checks if the numerical value "1234" stored in the number input area 25 is usable for an arithmetic operation. Since the numerical value "1234" exceeds the limit of three digits on the number of digits, the CPU 19 determines that the numerical value "1234" is unusable for an arithmetic operation (step S83: No).

In this case, in the storage procedure (G), the CPU 19 sets the arithmetic operation error flag in the key transfer memory storage area 31 (step S85) and ends the received data control process (return). In the storage procedure (H), the CPU 19 performs the display update process after the end of the received data control process to display a character "Err" indicating an error in the area of the main screen of the display unit 13 according to the arithmetic operation error flag.

In this manner, in the case of having received a numerical value unusable for an arithmetic operation from the smartphone 50, the calculator 10A causes the display unit 13 to display a character "Err" indicating an error without storing the received numerical value in the first number storage area 331 or the second number storage area 332, either before or after the input of an operator. Therefore, the user of the calculator 10A is able to easily confirm that the numerical value received as a target of an arithmetic operation is a numerical value unusable for an arithmetic operation.

In the above description, in the case where a numerical value usable for an arithmetic operation is received from the smartphone 50 and stored in the first number storage area 331 or the second number storage area 332 as a target of an arithmetic operation, the memory 2 symbol [M2] 13c corresponding to the memory key 82 is displayed on the display unit 13. Other symbols, however, different from the memory 2 symbol [M2] 13c or specific symbols or characters may be displayed on the display unit 13.

Moreover, in the above description, two memory keys 81 and 82 are provided, and the memory 2 symbol [M2] 13c corresponding to one memory key 82 is used to provide notice of having received a numerical value usable for an arithmetic operation from the smartphone 50. Even in the case of a configuration where only one memory key is provided as in the first embodiment, however, it is possible to provide notice of having received a numerical value usable for an arithmetic operation from the smartphone 50 in the same manner as described above, for example, by displaying a dedicated symbol (or icon) for providing notice that a numerical value for an arithmetic operation has been received from the smartphone 50.

As mentioned above, in the calculator 10A of the first embodiment, a numerical value keyed-in before the input of an operator for the four arithmetic operations is copied from the number input area 25 to the first number storage area 331 by the input of the operator, and a numerical value keyed-in after the input of an operator is copied to the second number storage area 332. Then, in response to the input of an operator "=," the calculator 10A performs an arithmetic operation using the numerical values stored in the first number storage area 331 and the second number storage area 332. In addition, the calculator 10A stores a numerical value received from the smartphone 50 into the first number storage area 331 or the second number storage area 332 depending on whether an operator has already been input, without awaiting the input of the operator by operating the calculation key 11b, in the received data control process (FIG. 7). As a result, a correct arithmetic operation result can be obtained by using the numerical value received from the smartphone 50 for an arithmetic operation with the numerical value having been keyed-in from the key input unit 11.

Comparative examples 1 and 2 will be described below with respect to the storage procedures for respective areas of the memory 21 in the case where a numerical value received from the smartphone 50 is not stored in the first number storage area 331 or the second number storage area 332 by the received data control process in the first embodiment.

COMPARATIVE EXAMPLE 1

The storage procedures (A) to (F) of FIG. 15 illustrate the contents stored in the respective areas obtained when the "5," "6," and "+" keys are pressed in order in the key input unit 11 and then a numerical value "1234" is received from the smartphone 50. As illustrated in FIG. 15, a numerical value "56" is input and thereafter an operator "+" is input, by which the numerical value "56" is stored in the first number storage area 331 ((A) to (C)). On the other hand, the numerical value "1234" received from the smartphone 50 is displayed on the display unit 13 by being stored in the number input area 25, but not being the keyed-in numerical value, the numerical value is not stored in the second number storage area 332 ((D) to (E)). At this point of time, regarding the state of the memory 21 of the calculator, the keyed-in numerical value "56" is stored in the first number storage area 331, while the numerical value "1234" received from the smartphone 50 is stored only in the number input area 25, but not stored in the second number storage area 332, which is an exceptional state. If an operator (=) is input from the key input unit 11 in such an exceptional memory state, the calculator will not work normally. For example, the numerical value "1234" stored in the number input area 25 will only be copied to the first number storage area 331 by overwriting (F). At this time, the display unit 13 displays the numerical value "1234" stored in the number input area 25 and cannot output a correct arithmetic operation result (a numerical value "1290" as a result of the arithmetic operation between the numerical value "56" displayed before the input of the operator "+" and the numerical value "1234" displayed thereafter).

COMPARATIVE EXAMPLE 2

In the storage procedures (A) to (F) of FIG. 16, there are illustrated the contents stored in the respective areas obtained when the numerical value "1234" is received from the smartphone 50 and thereafter the "+," "5," "6," and "=" keys are pressed in order in the key input unit 11. As illustrated in FIG. 16, since the numerical value "1234" received from the smartphone 50 is not a keyed-in numerical value, it is not copied to the first number storage area 331 even if the operator "+" is input, though the numerical value is displayed on the display unit 13 ((A)-(C)). If the numerical value "56" is keyed-in subsequently, the numerical value "56" is displayed on the display unit 13 and copied from the number input area 25 to the second number storage area 332 since the operator "+" for the four arithmetic operations has already been input ((D) and (E)). At this point of time, the memory 21 of the calculator is placed in an exceptional state such that, since the numerical value "1234" received from the smartphone 50 is not stored anywhere, the first number storage area 331 remains empty, while the keyed-in numerical value "56" is stored in the second number storage area 332 and in the number input area 25. If the operator (=) is input from the key input unit 11 in such an exceptional memory state, the calculator will not work normally, for example, the numerical value "56" stored in the number input area 25 is only copied to the first number storage area 331 by overwriting (F). At this time, the display unit 13 displays the numerical value "56" stored in the number input area 25 and cannot output a correct arithmetic operation result (a numerical value "1290" as a result of the arithmetic operation between the numerical value "1234" displayed before the input of the operator "+" and the numerical value "56" input thereafter).

In the calculator 10A of the first embodiment described above, the numerical value received from the smartphone 50 is also stored in the memory 21 in an appropriate procedure in the same manner as the numerical value input from the key input unit 11, thereby controlling the memory state so as not to be exceptional as in Comparative examples 1 and 2. This enables an output of a correct result of the arithmetic operation between the numerical value displayed before the input of the operator "+" and the numerical value displayed after the input in the case where the operator (=) is input from the key input unit 11.

Second Embodiment

A second embodiment will be described below. In the second embodiment, differences from the first embodiment will be mainly described. Basically, assuming that the same processing as that of the first embodiment is performed, the second embodiment will be described with reference to the flowcharts (FIGS. 3, 4A, 4B, and 7) used in the first embodiment.

Figure 17:
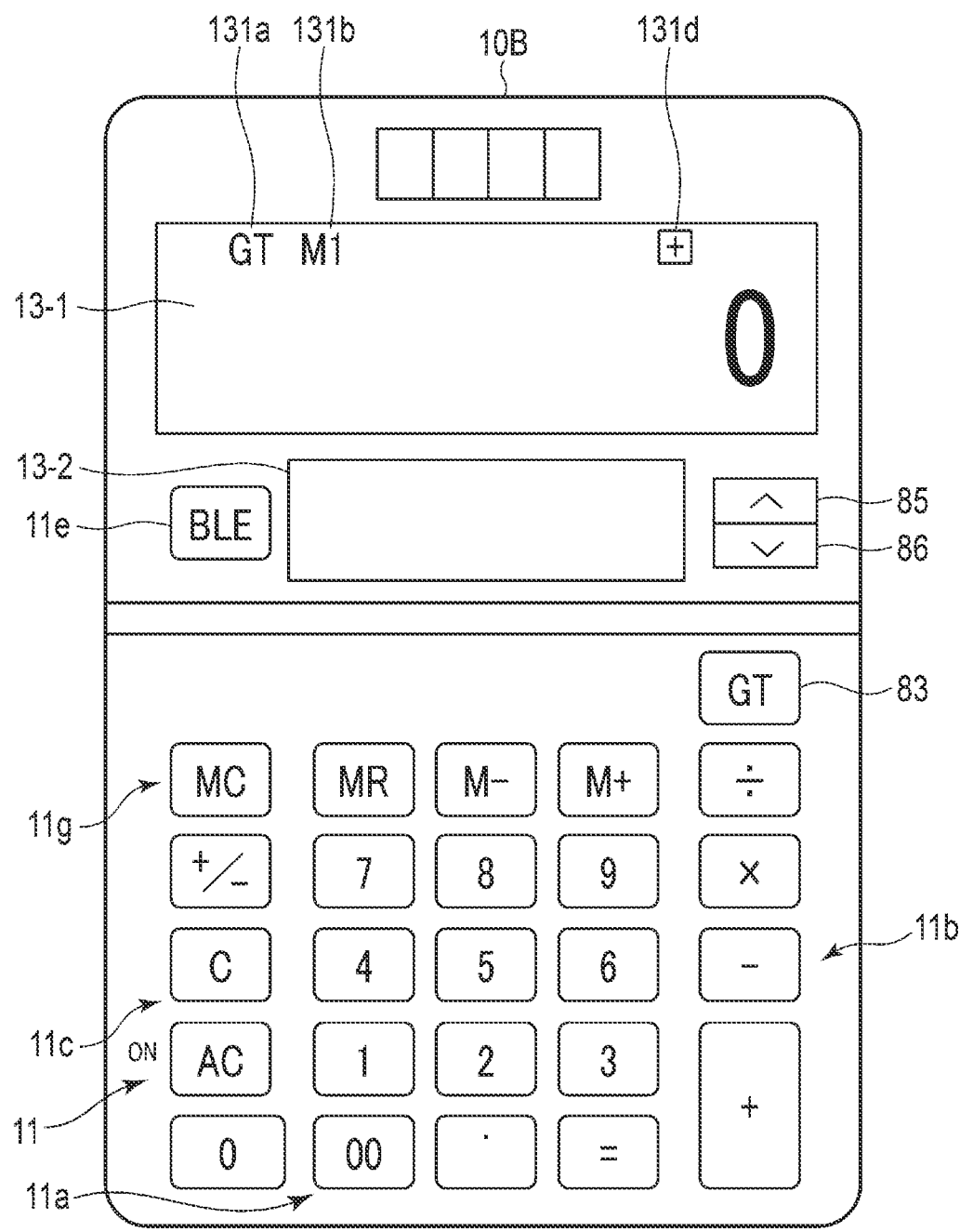
FIG. 17 is a front view illustrating the appearance configuration of a calculator according to a second embodiment.

FIG. 17 is a front view illustrating the appearance configuration of a calculator 10B according to the second embodiment. The illustration of a smartphone 50 that performs data communication with the calculator 10B is omitted. In the second embodiment, the calculator 10B has the display unit 13 of the first embodiment that has two displays (liquid crystal display units), namely a main screen 13-1 (a first display) and a sub-screen 13-2 (a second display). The main screen 13-1 and the sub-screen 13-2 are individually display-controlled and are able to display contents different from each other. The calculator 10B is able to perform an arithmetic operation in response to an operation of the key input unit 11 while displaying the arithmetic operation result on either the main screen 13-1 or the sub-screen 13-2. In this specification, description will be made assuming that the result of the arithmetic operation is displayed on the main screen 13-1. The main screen 13-1 displays a symbol corresponding to a [GT] key 83 (grand total key) (a grand total symbol [GT] 131a), a symbol (memory symbol [M1] 131b) corresponding to a memory key 11g ([MC] memory clear), [MR] (memory recall), [M+] (memory plus), or [M−] (memory minus)), an operator symbol 131d corresponding to an input operator, and the like. Although not illustrated, various symbols are displayed on the sub-screen 13-2 in the same manner as the main screen 13-1.

The calculator 10B is provided with a sub/main copy key 85 and a main/sub copy key 86. The sub/main copy key 85 is used to copy a numerical value displayed on the sub-screen 13-2 to the main screen 13-1 or to display a result of an arithmetic operation between a numerical value displayed on the main screen 13-1 and a numerical value displayed on the sub-screen 13-2 onto the main screen 13-1 in combination with the operation of the calculation key 11b. The main/sub copy key 86 is used to copy a numerical value displayed on the main screen 13-1 to the sub-screen 13-2 or to display the result of the arithmetic operation onto the sub-screen 13-2, as opposed to the sub/main copy key 85.

In the calculator 10A of the first embodiment described above, the memory 2 symbol [M2] 13c is displayed in the case where a numerical value usable for an arithmetic operation is received from the smartphone 50 and stored in the first number storage area 331 or the second number storage area 332. In the calculator 10B of the second embodiment, however, the sub-screen 13-2 displays the numerical value received from the smartphone 50, instead of the memory 2 symbol [M2] 13c. In the calculator 10B, the sub-screen 13-2 is used to display the numerical value received from the smartphone 50. Since it is assumed that the arithmetic operation result is displayed on the main screen 13-1, the numerical value received from the smartphone 50 is displayed on the sub-screen 13-2. In the case of displaying the arithmetic operation result on the sub-screen 13-2, however, the numerical value received from the smartphone 50 may be displayed on the main screen 13-1.

Assuming that the configuration of the electronic circuit of the calculator 10B in the second embodiment is the same as that of the calculator 10A in the first embodiment illustrated in FIG. 14, the description of the configuration will be omitted. The calculator 10B, however, shall implement the memory function by using only the M independent memory storage area 29 and use the key transfer memory storage area 31 for processing a numerical value received from the smartphone 50.

The following describes a concrete example of receiving numerical data from the smartphone 50 and then performing an arithmetic operation thereof.

First, description will be made on a case where a numerical value used for an arithmetic operation is received from the smartphone 50 before an operator is input by operating the arithmetic key 11b. FIG. 18 is a diagram illustrating the storage procedures (A) to (H) for respective areas of the memory 21 and the contents (symbol indications, numerical values) of the display screens of the main screens 13-1 and 13-2. FIG. 19 is a diagram illustrating sample displays of the main screens 13-1 and 13-2 corresponding to the storage procedures (A) to (H) illustrated in FIG. 18. Note that the storage procedures (A) to (H) in FIG. 18 correspond to the storage procedures (A) to (H) in FIG. 8. The following description mainly describes the parts that differ from the storage procedures described with reference to FIG. 8.

In the storage procedure (C), the CPU 19 stores "1234," which has been stored in the number input area 25, into the key transfer memory storage area 31 (step S84).

In the storage procedure (D), the CPU 19 stores the numerical value "1234," which has been stored in the key transfer memory storage area 31, into the number input area 25 and the first number storage area 331 (step S87). The CPU 19 stores the numerical value "1234" in the number input area 25 and in the first number storage area 331 and then moves to the process of step S4 to perform the display update process. As a result, the CPU 19 displays the numerical value "1234" stored in the number input area 25 onto the main screen 13-1 and displays the numerical value "1234" stored in the key transfer memory storage area 31 onto the sub-screen 13-2, as illustrated in (D) of FIG. 19.

Thereby, the user of the calculator 10B is able to easily confirm that the numerical value usable for an arithmetic operation has been received from the smartphone 50 and then input as a target of an arithmetic operation (stored in the first number storage area 331).

Hereinafter, the storage procedures (E) to (H) of FIG. 18 are assumed to be performed in the same manner as the storage procedures (E) to (H) of FIG. 8, and detailed description thereof will be omitted. As illustrated in (E) to (H) of FIG. 19, however, the main screen 13-1 displays numerical values and symbols that indicate the contents of an arithmetic operation and the sub-screen 13-2 displays a numerical value stored in the key transfer memory storage area 31, namely, the numerical value "1234" received from the smartphone 50.

Thus, the numerical value received from the smartphone 50 before the operator is input in the calculator 10B is stored in the key transfer memory storage area 31 and thereafter stored in the first number storage area 331. Then, the numerical value is used for an arithmetic operation with a numerical value stored in the second number storage area 332 by a key operation of the calculator 10B after the operator is input. Therefore, a correct arithmetic operation result can be obtained in the arithmetic operation based on the numerical value received from the smartphone 50.

The following describes a case where a numerical value for use in an arithmetic operation is received from the smartphone 50 after the operator is input by operating the calculation key 11b. FIG. 20 is a diagram illustrating the storage procedures (A) to (H) for respective areas of the memory 21 and the contents (symbol indications, numerical values) of the display screen. The numerical values and symbols in the display unit 13 are not illustrated since they are assumed to be displayed in the same manner as in FIG. 17. Note that the storage procedures (A) to (H) of FIG. 20 correspond to the storage procedures (A) to (H) of FIG. 10. The following description mainly describes the parts that differ from the storage procedures described with reference to FIG. 10.

In the storage procedure (F), the CPU 19 stores "1234," which has been stored in the number input area 25, into the key transfer memory storage area 31 (step S84).

In the storage procedure (G), the CPU 19 stores the numerical value "1234," which has been stored in the key transfer memory storage area 31, into the number input area 25 and the second number storage area 332 (step S88). Specifically, since the numerical value "1234" is received from the smartphone 50 after the operator "+" is input (step S86: Yes), the numerical value is stored into the second number storage area 332 to enable the numerical value to be usable for an arithmetic operation. The CPU 19 stores the numerical value "1234" in the number input area 25 and in the second number storage area 332 and then moves to the process of step S4 to perform the display update process. As a result, the CPU 19 displays the numerical value "1234" stored in the number input area 25 onto the main screen 13-1 and displays the numerical value "1234" stored in the key transfer memory storage area 31 onto the sub-screen 13-2.

Thereby, the user of the calculator 10B is able to easily confirm that a numerical value usable for an arithmetic operation has been received from the smartphone 50 and input as a target of an arithmetic operation (stored into the second number storage area 332) after the operator is input by operating the "+" key.

In the second embodiment, the sub-screen 13-2 is used to display the numerical value received from the smartphone 50, which makes it possible to clearly recognize that the numerical value has been received from the smartphone 50 and to recognize the received numerical value clearly.

The following describes an example of operation procedures for a case where numerical data is received from the smartphone 50 and then a numerical value is input before an operator is input in the calculator 10B.

FIG. 21 is a diagram illustrating the storage procedures (A) to (G) for respective areas of the memory 21 and the contents (symbol indications, numerical values) of the display screens of the main screens 13-1 and 13-2. Note that the storage procedures (A) to (G) in FIG. 21 correspond to the storage procedures (A) to (D) and (F) to (H) in FIG. 18. The following description mainly describes the parts that differ from the storage procedures described with reference to FIG. 21.

In the storage procedure (D), the CPU 19 stores the numerical value "1234," which has been stored in the key transfer memory storage area 31, into the number input area 25 and the first number storage area 331 (step S87). The CPU 19 stores the numerical value "1234" in the number input area 25 and in the first number storage area 331 and then moves to the process of step S4 to perform the display update process. As a result, the CPU 19 displays the numerical value "1234" stored in the number input area 25 on the main screen 13-1 and displays the numerical value "1234" stored in the key transfer memory storage area 31 on the sub-screen 13-2.

Thereby, the user of the calculator 10B is able to recognize that a numerical value has been received from the smartphone 50.

Subsequently, if the "5" and "6" keys of the key input unit 11 are pressed in order in the storage procedures (E) and (F), the CPU 19 acquires the input data (step S1) and overwrites the numerical value "1234" stored in the number input area 25 to store the numerical values "5" and "6" in order (step S7). In response to the numerical value "5" being stored in the number input area 25, the CPU 19 displays "5" and "56" in order on the main screen of the display unit 13, in place of the numerical value "1234" that has been displayed until then (step S4). Since an operator is not input yet and the number is not fixed at this point of time, the numerical value "56" stored in the number input area 25 is not stored in the first number storage area 331. Moreover, since the numerical value "1234" stored in the key transfer memory storage area 31 is not changed, the numerical value "1234" is still displayed on the sub-screen 13-2.

If the "=" key of the key input unit 11 is pressed in the storage procedure (H), the CPU 19 acquires the input data (step S1), stores "=" (equal) in the operator information area 35, fixes the numerical value "56" stored in the number input area 25, and then stores the numerical value into the first number storage area 331. Since an operator for the four arithmetic operations is not input yet at this point of time, the CPU 19 does not perform an arithmetic operation and does not change the numerical values respectively stored in the number input area 25, the first number storage area 331, the second number storage area 332, and the key transfer memory storage area 31.

The following describes an example of operation procedures for a case where numerical data is received from the smartphone 50 before an operator is input after a numerical value is input in the calculator 10B.

FIG. 22 is a diagram illustrating the storage procedures (A) to (G) for respective areas of the memory 21 and the contents (symbol indications, numerical values) of the display screens of the main screens 13-1 and 13-2. Note that the storage procedures (A) to (G) of FIG. 22 correspond to the storage procedures (A), (B), and (D) to (H) of FIG. 20. The following description mainly describes the parts that differ from the storage procedures described with reference to FIG. 20.

If a numerical value "56" is input by a key operation of the key input unit 11 in the storage procedures (A) and (B), a numerical value "56" is stored in the number input area 25. If a numerical value "1234" is received from the smartphone 50 before an operator is input in the storage procedure (C), the CPU 19 clears the numerical value stored in the key transfer memory storage area 31 and stores "0" in the key transfer memory storage area 31 (step S81).

Subsequently, the CPU 19 stores the numerical data "1234," which has been stored in the buffer area 24, into the number input area 25 in the storage procedure (D) and then stores "1234," which has been stored in the number input area 25, into the key transfer memory storage area 31 in the storage procedure (E). Moreover, since an operator is not input yet, the CPU 19 stores the numerical value "1234," which has been stored in the key transfer memory storage area 31, into the first number storage area 331 in the storage procedure (F).

The CPU 19 stores the numerical value "1234" in the number input area 25 and in the first number storage area 331 and then moves to the process of step S4 to perform the display update process. As a result, the CPU 19 displays the numerical value "1234" stored in the number input area 25 on the main screen 13-1 and displays the numerical value "1234" stored in the key transfer memory storage area 31 on the sub-screen 13-2.

Thereby, the user of the calculator 10B is able to recognize that the numerical value has been received from the smartphone 50.

If the "=" key of the key input unit 11 is pressed in the storage procedure (G), the CPU 19 acquires the input data (step S1) and stores "=" (equal) in the operator information area 35. Since an operator for the four arithmetic operations is not input at this point of time, the CPU 19 does not perform an arithmetic operation and does not change the numerical values respectively stored in the number input area 25, the first number storage area 331, the second number storage area 332, and the key transfer memory storage area 31.

In this manner, the calculator 10B is able to stores the numerical value received from the smartphone 50 into the key transfer memory storage area 31 independently of the presence or absence of the input of an operator and to display the numerical value on the sub-screen 13-2 according to whether the numerical value is stored in the key transfer memory storage area 31. Therefore, the user of the calculator 10B is able to recognize that the numerical value has been received from the smartphone 50. As mentioned above, even if the numerical value or "=" (equal) is input by operating the key input unit 11 before or after the numerical value is received from the smartphone 50, the numerical value received from the smartphone 50 remains stored in the key transfer memory storage area 31. Therefore, the numerical value stored in the key transfer memory storage area 31 (the numerical value displayed on the sub-screen 13-2) is able to be used for a subsequent arithmetic operation.

The storage procedures of FIGS. 21 and 22 are assumed to be performed in the same manner as the storage procedures in the first embodiment, except that the memory 2 symbol [M2] 13c is displayed in the calculator 10A of the first embodiment instead of the display of the sub-screen 13-2 of the second embodiment.

In the first and second embodiments described above, the display unit 13 (liquid crystal display unit) is used, as an output device, to receive numerical data from the smartphone 50 (external device) and to provide notice of the numerical data being stored in the first number storage area 331 or the second number storage area 332. It is, however, also possible to use other output devices. For example, a light emitting diode (LED), a vibrator, a speaker, a buzzer, or the like can be used as an output device. In the case of using an LED, for example, LEDs corresponding to multiple colors are provided and an LED of a predetermined display color is turned on or made blinking for notification. Moreover, in the case of using an LED, notice is provided by controlling any one of indications of blinking, lighting, or blinking intervals. Similarly, also with respect to the vibrator or the speaker, it is possible to provide notice of having received numerical data from the smartphone 50 and having stored the numerical data in the first number storage area 331 or in the second number storage area 332 by performing preset drive control.

In addition, the present invention is not limited to the above embodiments, and can be variously modified at the implementation stage without departing from the gist of the invention. Furthermore, these embodiments may be carried out in combination as appropriate, in which case the combined effects can be obtained. Further, the above-described embodiments include various inventions, and various inventions can be extracted by a combination selected from a plurality of disclosed configuration requirements. For example, even if some configuration requirements are deleted from all the configuration requirements illustrated in the embodiments, the configuration in which the configuration requirements are deleted can be extracted as the invention if the problem can be solved and the effect is obtained.

What is claimed is:

1. An electronic device comprising:
   a communication unit used for communicating with an external device;
   an input device comprising a plurality of keys for accepting an input operation of data used for an arithmetic operation;
   an output device that outputs information;
   a memory; and
   at least one processor configured to:
   cause the communication unit to receive numerical data;
   determine whether the numerical data is usable for the arithmetic operation;
   in a case where the numerical data is determined to be usable for the arithmetic operation, cause the memory to store the numerical data and first information;
   cause the output device to provide notice of the first information stored in the memory;
   determine whether the input operation of the data used for the arithmetic operation has been accepted by the input device; and
   in a case where the input operation of the data used for the arithmetic operation has been accepted by the input device, perform the arithmetic operation based on the data accepted by the input device and the numerical data determined to be usable for the arithmetic operation stored in the memory.

2. The electronic device according to claim 1, wherein:
   the input device comprises a first operation key for inputting the numerical data for use in the arithmetic operation and a second operation key for providing an instruction to perform a specific operation; and
   the at least one processor is configured to:
   cause the output device to output the numerical data whose input was accepted in the case where the input of the numerical data for use in the arithmetic operation is accepted by the operation of the first operation key; and
   cause the output device to provide notice of second information different from the first information in the case where the specific operation is performed by the operation of the second operating key.

3. The electronic device according to claim 2, wherein the at least one processor is configured to:
   cause the output device to display a first symbol that serves as the first information stored in the memory; and
   cause the output device to display a second symbol that is different from the first symbol and serves as the second information in the case where the specific operation is performed.

4. The electronic device according to claim 2, wherein:
   the output device comprises a first display and a second display; and
   the at least one processor is configured to:
   cause the first display to display the first information; and
   cause the second display to display the second information.

5. The electronic device according to claim 2, wherein:
   the input device comprises:
   a third operation key used for inputting an operator for four operations for use in the arithmetic operation; and
   a fourth operation key used for providing an instruction to perform the arithmetic operation using the input operator for the four operations;
   the memory is provided with an operand storage area for storing the numerical data determined to be usable for the arithmetic operation; and
   the at least one processor performs the processes of:
   storing the numerical data into a first area of the operand storage area before the operator for the four operations is input in the case where it is determined that the numerical data has been received from the external device before the operator for the four operations is input by the operation of the third operation key;
   storing the numerical data into a second area different from the first area of the operand storage area before the operator that provides an instruction to perform an arithmetic operation is input by the operation of the fourth operation key in the case where it is determined that the numerical data has been received from the external device after the operator for the four operations is input by the operation of the third operation key; and
   performing an arithmetic operation on the basis of the operator input by the operation of the third operation key and each numerical data stored in the first and second areas in the case where it is determined that an operator that provides an instruction to perform an arithmetic operation is input by the operation of the fourth operation key.

6. The electronic device according to claim 5, wherein the at least one processor is configured to:
   initialize the operand storage area; and
   in the case where the numerical data is determined to be usable for the arithmetic operation, cause the memory to store the numerical data and the first information in the initialized operand storage area.

7. The electronic device according to claim 6, wherein the at least one processor is configured to, in the case where the numerical data received from the external device is unusable for the arithmetic operation, not store the numerical data into the operand storage area; and cause the output device to provide notice of error information.

8. The electronic device according to claim 5, wherein:
the memory is provided with a number input area for storing data to be displayed; and
the at least one processor is configured to perform the processes of:
storing the numerical data received from the external device into the number input area;
determining whether the numerical data has been received from the external device before or after the operator for the four operations is input by the operation of the third operation key;
storing the numerical data having been stored in the number input area into one of the first area and the second area different from the first area of the operand storage area in the case of determining that the numerical data has been received before the operator is input; and
storing the numerical data having been stored in the number input area into the other of the first area and the second area of the operand storage area in the case of determining that the numerical data has been received after the operator is input.

9. The electronic device according to claim 8, wherein:
the memory is provided with a key transfer memory storage area for storing the numerical data received from the external device; and
the at least one processor is configured to perform the processes of:
storing the numerical data received from the external device into the number input area;
storing the numerical data stored in the number input area into the key transfer memory storage area;
determining whether the numerical data is received from the external device before or after the operator for the four operations is input by the operation of the third operation key;
storing the numerical data stored in the key transfer memory storage area into the first area of the operand storage area in the case of determining that the numerical data has been received before the operator is input; and
storing the numerical data stored in the key transfer memory storage area into the second area of the operand storage area in the case of determining that the numerical data has been received after the operator is input.

10. The electronic device according to claim 9, wherein the at least one processor is configured to cause the output device to provide notice of the first information after storing the numerical data stored in the number input area into the key transfer memory storage area.

11. The electronic device according to claim 10, wherein:
the memory is provided with an operator information area for use in storing data corresponding to the operator input by the operation of the third operation key or the fourth operation key; and
the at least one processor is configured to:
store the numerical data stored in the number input area into the key transfer memory storage area; and
store data, indicating that the numerical data stored in the number input area has been stored in the key transfer memory storage area, into the operator information area, and then cause the output device to provide notice of the first information.

12. The electronic device according to claim 5, wherein:
the at least one processor is configured to perform the processes of:
determining whether the numerical data has been received from the external device before or after the operator for the four arithmetic operations is input by the operation of the third operation key;
initializing the first area in the case of determining that the numerical data has been received before the operator for the four operations is input by the operation of the third operation key; and
initializing the second area in the case of determining that the numerical data has been received after the operator for the four operations is input by the operation of the third operation key.

13. The electronic device according to claim 12, wherein the at least one processor is configured to cause the output device to provide notice of the first information in the case where the first area or the second area is initialized and thereafter the value in the initialized first or second area is rewritten.

14. The electronic device according to claim 12, wherein:
the memory is provided with an operator information area for use in storing data corresponding to the operator input by the operation of the third operation key or the fourth operation key; and
the at least one processor is configured to write data corresponding to the first information into the operator information area when the initialized first or second area is rewritten.

15. The electronic device according to claim 1, wherein the at least one processor is configured to cause the output device to provide notice of error information in the case where the numerical data is determined to be unusable for the arithmetic operation.

16. The electronic device according to claim 1, wherein:
the memory is provided with a key transfer memory storage area for storing the numerical data received from the external device; and
the at least one processor is configured to store the numerical data received from the external device into the key transfer memory storage area and then cause the output device to provide notice of the first information.

17. The electronic device according to claim 16, wherein:
the memory is provided with an operand storage area in which a numerical value used for an arithmetic operation is stored; and
the at least one processor is configured to store the numerical data received from the external device into the key transfer memory storage area and then store the numerical data into the operand storage area.

18. The electronic device according to claim 17, wherein:
the input device includes a third operation key for inputting an operator for four operations used in the arithmetic operation and a fourth operation key for inputting an operator for providing an instruction to perform an arithmetic operation; and
after receiving the numerical data from the external device, the received numerical data is stored in the operand storage area before the third operation key and the fourth operation key are operated.

19. A control method for an electronic device including a communication unit used for communicating with an external device, an input device having a plurality of keys for accepting an input operation of data used for an arithmetic operation, an output device that outputs information, and a memory, wherein the control method comprises:
- causing the communication unit to receive numerical data;
- determining whether the numerical data is usable for the arithmetic operation;
- in a case where the numerical data is determined to be usable for the arithmetic operation, causing the memory to store the numerical data and first information;
- causing the output device to provide notice of the first information stored in the memory;
- determining whether the input operation of the data used for the arithmetic operation has been accepted by the input device; and
- in a case where the input operation of the data used for the arithmetic operation has been accepted by the input device, performing the arithmetic operation based on the data accepted by the input device and the numerical data determined to be usable for the arithmetic operation stored in the memory.

20. A non-transitory computer-readable recording medium for recording a program for an electronic device, wherein:
- the electronic device includes a communication unit for use in communicating with an external device, an input device having a plurality of keys for accepting an input operation of data used for an arithmetic operation, an output device that outputs information, and a memory; and
- the program causes at least one processor to at least:
  - cause the communication unit to receive numerical data;
  - determine whether the numerical data is usable for the arithmetic operation;
  - in a case where the numerical data is determined to be usable for the arithmetic operation, cause the memory to store the numerical data and first information;
  - cause the output device to provide notice of the first information stored in the memory;
  - determine whether the input operation of the data used for the arithmetic operation has been accepted by the input device; and
  - in a case where the input operation of the data used for the arithmetic operation has been accepted by the input device, perform the arithmetic operation based on the data accepted by the input device and the numerical data determined to be usable for the arithmetic operation stored in the memory.

* * * * *